(12) United States Patent
Miranto et al.

(10) Patent No.: US 10,725,590 B2
(45) Date of Patent: Jul. 28, 2020

(54) SLIDING RANGE GATE FOR LARGE AREA ULTRASONIC SENSOR

(71) Applicant: QUALCOMM Incorporated, San Diego, CA (US)

(72) Inventors: James Anthony Miranto, Kenmore, NY (US); Steven Pezanoski, Lakeside, CA (US); Stephen James Potter, San Diego, CA (US); Todd Campbell, San Diego, CA (US); Jack Conway Kitchens, Town of Tonawanda, NY (US); Stephen Michael Gojevic, Lockport, NY (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 15/828,187

(22) Filed: Nov. 30, 2017

(65) Prior Publication Data

US 2019/0101437 A1 Apr. 4, 2019

Related U.S. Application Data

(60) Provisional application No. 62/565,479, filed on Sep. 29, 2017.

(51) Int. Cl.
*G06F 3/043* (2006.01)
*G01S 7/52* (2006.01)
(Continued)

(52) U.S. Cl.
CPC .......... *G06F 3/0436* (2013.01); *B06B 1/0207* (2013.01); *B06B 1/0622* (2013.01);
(Continued)

(58) Field of Classification Search
CPC .. G06F 3/0436; G06K 9/0002; G01S 15/8925
See application file for complete search history.

(56) References Cited

U.S. PATENT DOCUMENTS

| 5,103,129 A | 4/1992 | Slayton et al. |
| 5,354,992 A | 10/1994 | Thompson et al. |

(Continued)

FOREIGN PATENT DOCUMENTS

| CN | 107194384 A | 9/2017 |
| GB | 772083 A | 4/1957 |

(Continued)

OTHER PUBLICATIONS

International Search Report and Written Opinion—PCT/US2018/049221—ISA/EPO—dated Dec. 17, 2018.

(Continued)

*Primary Examiner* — Tarun Sinha
(74) *Attorney, Agent, or Firm* — Weaver Austin Villeneuve & Sampson LLP

(57) ABSTRACT

An apparatus includes an ultrasonic sensor array and a sensor controller. The sensor array includes a plurality of ultrasonic sensor pixels, each sensor pixel including an ultrasonic receiver and a receiver bias electrode and being operable in one or both of a transmit mode of operation or a read mode of operation. The sensor controller is electrically coupled with the receiver bias electrodes. The sensor controller is configured to set, at each sensor pixel, a range gate window (RGW) by modulating a bias voltage applied to the receiver bias electrode and to set, for a first portion of the ultrasonic sensor pixels, a first RGW. The sensor controller is configured to set, for a second portion of the ultrasonic sensor pixels, a second RGW, and establish a first temporal delay between the first RGW and the second RGW.

30 Claims, 14 Drawing Sheets

(51) Int. Cl.
  *B06B 1/06* (2006.01)
  *G06F 1/16* (2006.01)
  *G01S 15/89* (2006.01)
  *G06F 3/041* (2006.01)
  *B06B 1/02* (2006.01)
  *G01H 11/08* (2006.01)
  *G06K 9/00* (2006.01)
  *H04L 29/06* (2006.01)
  *H04W 12/06* (2009.01)

(52) U.S. Cl.
  CPC .......... *B06B 1/0629* (2013.01); *B06B 1/0688* (2013.01); *G01H 11/08* (2013.01); *G01S 7/5202* (2013.01); *G01S 7/52026* (2013.01); *G01S 7/52079* (2013.01); *G01S 7/52085* (2013.01); *G01S 15/8913* (2013.01); *G01S 15/8925* (2013.01); *G06F 1/169* (2013.01); *G06F 3/0412* (2013.01); *G06F 3/0416* (2013.01); *G06F 3/0433* (2013.01); *G06F 3/04166* (2019.05); *G06K 9/0002* (2013.01); *H04L 63/0861* (2013.01); *H04W 12/06* (2013.01); *B06B 2201/20* (2013.01); *B06B 2201/56* (2013.01); *B06B 2201/70* (2013.01); *G06F 1/1626* (2013.01); *G06F 2203/04104* (2013.01)

(56) References Cited

U.S. PATENT DOCUMENTS

| 7,037,268 B1 | 5/2006 | Sleva et al. |
| 2004/0190376 A1 | 9/2004 | Hulden et al. |
| 2008/0028868 A1 | 2/2008 | Konzelmann et al. |
| 2011/0248160 A1 | 10/2011 | Belov et al. |
| 2014/0278221 A1 | 9/2014 | Troy et al. |
| 2015/0016223 A1 | 1/2015 | Dickinson et al. |
| 2015/0198699 A1 | 7/2015 | Kuo et al. |
| 2016/0051321 A1 | 2/2016 | Salahieh et al. |
| 2017/0090024 A1 | 3/2017 | Kitchens, II et al. |
| 2017/0090028 A1* | 3/2017 | Djordjev ................. G01S 15/89 |
| 2017/0254887 A1 | 9/2017 | Sapozhnikov et al. |
| 2018/0031686 A1 | 2/2018 | Kuo et al. |
| 2018/0046836 A1 | 2/2018 | Hinger et al. |
| 2018/0060635 A1 | 3/2018 | Li et al. |
| 2018/0140278 A1 | 5/2018 | Bromberg et al. |
| 2018/0310916 A1 | 11/2018 | Loebl et al. |
| 2018/0329272 A1 | 11/2018 | Muir et al. |
| 2019/0102045 A1 | 4/2019 | Miranto et al. |
| 2019/0102046 A1 | 4/2019 | Miranto et al. |
| 2019/0354743 A1 | 11/2019 | Hinger et al. |

FOREIGN PATENT DOCUMENTS

| WO | WO0105522 A1 | 1/2001 |
| WO | WO2017052836 A1 | 3/2017 |
| WO | WO2017066612 A1 | 4/2017 |

OTHER PUBLICATIONS

International Search Report and Written Opinion—PCT/US2018/053183—ISA/EPO—dated Jan. 7, 2019.
International Search Report and Written Opinion—PCT/US2018/053189—ISA/EPO—dated Jan. 30, 2019.
U.S. Office Action dated Feb. 26, 2019, in U.S. Appl. No. 15/827,528.
U.S. Final Office Action dated Aug. 23, 2019, in U.S. Appl. No. 15/827,528.

* cited by examiner

Detail A

Detail B

Detail D

SLIDING RANGE GATE FOR LARGE AREA ULTRASONIC SENSOR

PRIORITY CLAIM

This disclosure claims priority to U.S. Provisional Patent Application No. 62/565,479, filed on Sep. 29, 2017, entitled "SLIDING RANGE GATE FOR LARGE AREA ULTRASONIC SENSOR," assigned to the assignee hereof and incorporated herein by reference in its entirety. The present application may also be considered to be related to co-pending U.S. patent application Ser. No. 15/827,529, filed on Nov. 30, 2017, entitled "LAYER FOR INDUCING VARYING DELAYS IN ULTRASONIC SIGNALS PROPAGATING IN ULTRASONIC SENSOR," and co-pending U.S. patent application Ser. No. 15/827,528, filed on Nov. 30, 2017, entitled "SYSTEM AND METHOD FOR ULTRASONIC SENSING," both assigned to the assignee hereof.

TECHNICAL FIELD

This disclosure relates to ultrasonic transducer arrays and, more particularly to a large area array of ultrasonic transducers incorporating a sliding range gate.

DESCRIPTION OF THE RELATED TECHNOLOGY

Ultrasonic sensor systems may use a transmitter to generate and send an ultrasonic wave through a transmissive medium and towards an object to be detected and/or imaged. The ultrasonic transmitter may be operatively coupled with an ultrasonic sensor array configured to detect portions of the ultrasonic wave that are reflected from the object. At each material interface encountered by the ultrasonic pulse, a portion of the ultrasonic pulse may be reflected. In some implementations, an ultrasonic pulse may be produced by starting and stopping the transmitter during a short interval of time (e.g. less than 1 microsecond). An ultrasonic sensor system may include biometric sensors, such as fingerprint or handprint sensors, and/or other ultrasonic imaging applications.

Piezoelectric ultrasonic transducers are attractive candidates for such applications and may include piezoelectric micromechanical ultrasonic transducers (PMUTs) configured as a multilayer stack that includes a piezoelectric layer stack. The piezoelectric layer stack may include a layer of piezoelectric material such as, for example, a layer of polyvinylidene fluoride (PVDF) or a PVDF copolymer. The piezoelectric layer may convert vibrations caused by ultrasonic reflections into electrical output signals. In some implementations, the ultrasonic sensor system further includes a thin-film transistor (TFT) layer that may include an array of sensor pixel circuits that may, for example, amplify electrical output signals generated by the piezoelectric layer.

In some applications, a two-dimensional array of a large number of PMUT elements (a "PMUT array") may be contemplated. For example an array of 1-5 million PMUTs may be contemplated for some large area ultrasonic sensors. In the absence of the presently disclosed techniques, the TFT layer of such a large area ultrasonic sensors may limit the current to the pixel elements and degrade transmission of the signals generated by the piezoelectric layer, due to narrow pixel to pixel address and signal traces.

As a result, improved PMUT drive/readout schemes are desirable, particularly for large PMUT arrays.

SUMMARY

The systems, methods and devices of this disclosure each have several innovative aspects, no single one of which is solely responsible for the desirable attributes disclosed herein.

One innovative aspect of the subject matter described in this disclosure relates to an ultrasonic sensor array including a plurality of ultrasonic sensor pixels, each sensor pixel including an ultrasonic receiver and a receiver bias electrode and being operable in one or both of a transmit mode of operation or a read mode of operation and a sensor controller electrically coupled with the receiver bias electrodes. The sensor controller is configured to set, at each sensor pixel, a range gate window (RGW) by modulating a bias voltage applied to the receiver bias electrode. The sensor controller is configured to set, for a first portion of the ultrasonic sensor pixels, a first RGW. The sensor controller is configured to set, for a second portion of the ultrasonic sensor pixels, a second RGW, and establish a first temporal delay between the first RGW and the second RGW.

In some examples, the apparatus may be configured to establish a temporal phasing of acoustic signals returned, as a result of interaction with a target object, to the ultrasonic sensor array such that the first portion of the ultrasonic sensor pixels receives the returned acoustic signals at a different time than the second portion of the ultrasonic sensor pixels. In some examples, the ultrasonic receivers may be disposed in a receiver array layer, the ultrasonic sensor array may include ultrasonic transmitters disposed in a transmitter array layer, and the receiver array layer is not parallel with the transmitter array layer. In some examples, a non-uniform separation between the receiver array layer and the transmitter array layer may establish the temporal phasing of the returned acoustic signals. In some examples, the ultrasonic sensor array may include ultrasonic transmitters disposed in a transmitter array layer, the transmitter array layer may be segmented into separate portions, and the sensor controller may be configured to cause the ultrasonic transmitters to launch acoustic signals, from the separate portions, non-simultaneously so as to establish the temporal phasing of the returned acoustic signals.

In some examples, the first RGW may have a first RGW duration and the first temporal delay may be approximately 5-25% of the first RGW duration. In some examples, the first RGW duration may be between 200 nanoseconds and 1000 nanoseconds.

In some examples, the first temporal delay may be approximately 25 nanoseconds.

In some examples, the sensor controller may be configured to set, for each of a plurality of portions of the ultrasonic sensor pixels a respective RGW and to establish a respective temporal delay between each respective RGW.

In some examples, the sensor controller may be configured to set, for each of a plurality of portions the sensor controller is configured to set a respective range gate delay (RGD). In some examples, the RGD for each portion, k+1, may be longer than the RGD for each portion, k, by a temporal delay period. In some examples, the first RGW may have a first RGW duration and the temporal delay period is approximately 5-25% of the first RGW duration.

According to some implementations, for an ultrasonic sensor array, including a first portion of ultrasonic sensor pixels and a second portion of ultrasonic sensor pixels, a method includes setting, with a sensor controller, a first range gate window (RGW) for the first portion of ultrasonic sensor pixels, and setting, with the sensor controller, a second RGW for the second portion of ultrasonic sensor pixels so as to establish a first temporal delay between the first RGW and the second RGW. Each sensor pixel includes an ultrasonic receiver and a receiver bias electrode and is operable in one or both of a transmit mode of operation or a read mode of operation. The sensor controller is electrically coupled with the receiver bias electrodes, and setting the first RGW and the second RGW includes modulating a bias voltage applied to the receiver bias electrode.

In some examples, the ultrasonic sensor array may be configured to establish a temporal phasing of acoustic signals returned, as a result of interaction with a target object, to the ultrasonic sensor array such that the first portion of the ultrasonic sensor pixels receives the returned acoustic signals at a different time than the second portion of the ultrasonic sensor pixels.

In some examples, the method may further include setting, with the sensor controller, for each of a plurality of portions of the ultrasonic sensor pixels a respective RGW and establishing, with the sensor controller, a respective temporal delay between each respective RGW.

In some examples, the method may further include setting, with the sensor controller, for each of a plurality of portions of the ultrasonic sensor pixels, a respective range gate delay (RGD). In some examples, the RGD for each portion, k+1, may be longer than the RGD for each portion, k, by a temporal delay period. In some examples, the first RGW may have a first RGW duration and the temporal delay period may be approximately 5-25% of the first RGW duration.

According to some implementations, for an ultrasonic array including a first portion of ultrasonic sensor pixels and a second portion of ultrasonic sensor pixels, a non-transitory computer readable medium stores program code to be executed by a sensor controller of the ultrasonic sensor array, the program code comprising instructions configured to cause the sensor controller to: set, with a sensor controller, a first range gate window (RGW) for the first portion of ultrasonic sensor pixels, and set, with the sensor controller, a second RGW for the second portion of ultrasonic sensor pixels so as to establish a first temporal delay between the first RGW and the second RGW. Each sensor pixel includes an ultrasonic receiver and a receiver bias electrode and is operable in one or both of a transmit mode of operation or a read mode of operation. The sensor controller is electrically coupled with the receiver bias electrodes and setting the first RGW and the second RGW includes modulating a bias voltage applied to the receiver bias electrode.

In some examples, the ultrasonic sensor array may be configured to establish a temporal phasing of acoustic signals returned, as a result of interaction with a target object, to the ultrasonic sensor array such that the first portion of the ultrasonic sensor pixels receive the returned acoustic signals at a different time than the second portion of the ultrasonic sensor pixels.

In some examples, the computer readable medium may further include instructions to cause the sensor controller to set, for each of a plurality of portions of the ultrasonic sensor pixels a respective RGW and establish a respective temporal delay between each respective RGW.

In some examples, the computer readable medium may further include instructions to cause the sensor controller to set, for each of a plurality of portions, a respective range gate delay (RGD). In some examples, the RGD for each portion, k+1, may be longer than the RGD for each portion, k, by a temporal delay period. In some examples, the first RGW may have a first RGW duration and the temporal delay period may be approximately 5-25% of the first RGW duration.

According to some implementations, an apparatus includes an ultrasonic sensor array including a plurality of ultrasonic sensor pixels, each sensor pixel including an ultrasonic receiver and a receiver bias electrode and being operable in one or both of a transmit mode of operation or a read mode of operation; and, electrically coupled with the receiver bias electrodes, and means for controlling the ultrasonic sensor array, the means configured to: set, at each sensor pixel, a range gate window (RGW) by modulating a bias voltage applied to the receiver bias electrode, set, for a first portion of the ultrasonic sensor pixels, a first RGW; and set, for a second portion of the ultrasonic sensor pixels, a second RGW, and establish a first temporal delay between the first RGW and the second RGW.

In some examples, the apparatus may be configured to establish a temporal phasing of acoustic signals returned, as a result of interaction with a target object, to the ultrasonic sensor array such that the first portion of the ultrasonic sensor pixels receives the returned acoustic signals at a different time than the second portion of the ultrasonic sensor pixels. In some examples, the ultrasonic receivers may be disposed in a receiver array layer, the ultrasonic sensor array may include ultrasonic transmitters disposed in a transmitter array layer, and the receiver array layer is not parallel with the transmitter array layer. In some examples, a non-uniform separation between the receiver array layer and the transmitter array layer may establish the temporal phasing of the returned acoustic signals. In some examples, the ultrasonic sensor array may include ultrasonic transmitters disposed in a transmitter array layer, the transmitter array layer may be segmented into separate portions, and the means for controlling the ultrasonic sensor array may be configured to cause the ultrasonic transmitters to launch acoustic signals, from the separate portions, non-simultaneously so as to establish the temporal phasing of the returned acoustic signals.

In some examples, the means for controlling the ultrasonic sensor array may be configured to set, for each of a plurality of portions of the ultrasonic sensor pixels a respective RGW and to establish a respective temporal delay between each respective RGW.

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

DETAILED DESCRIPTION

Figure 1:
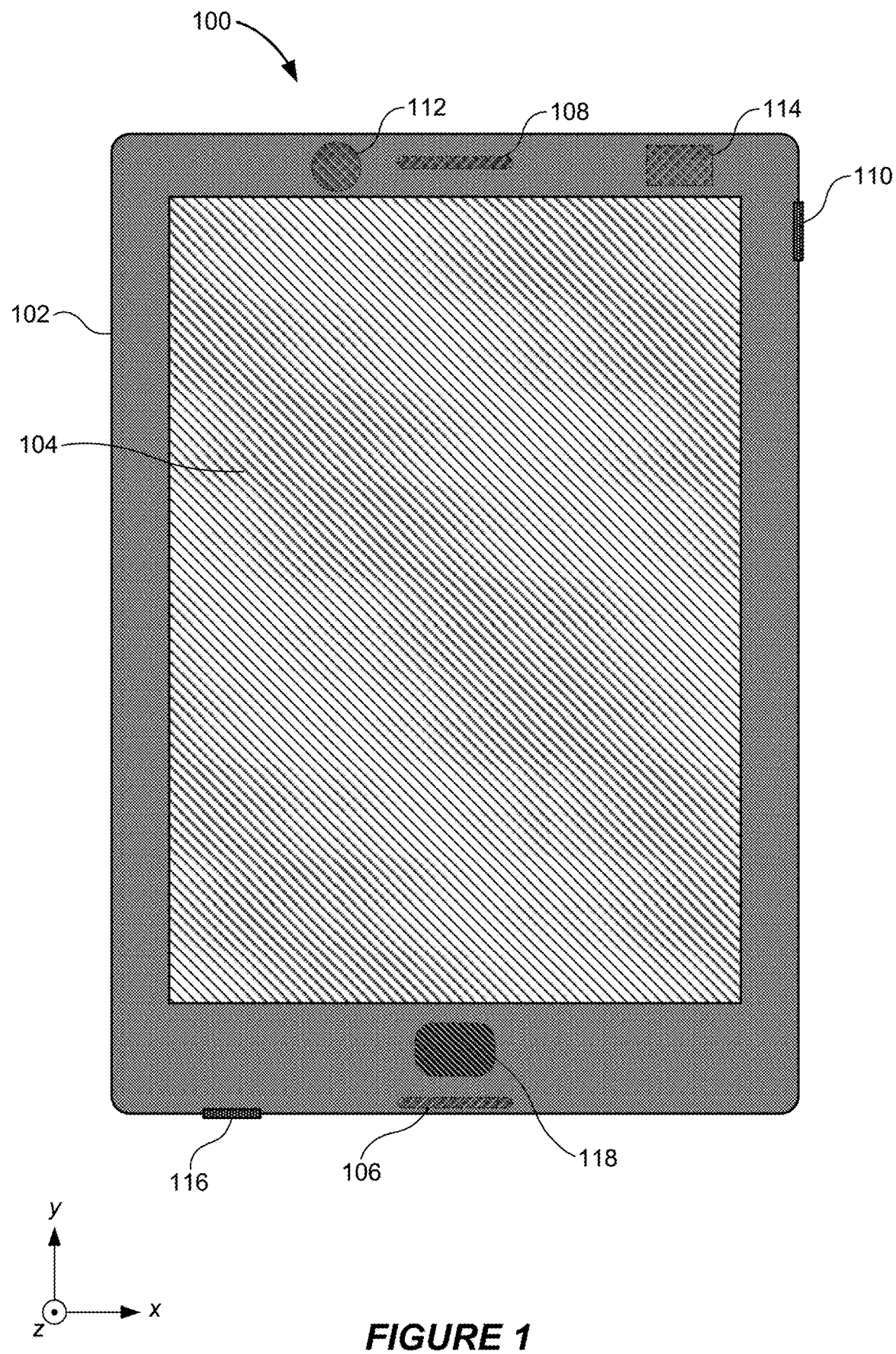
FIG. 1 shows a front view of a diagrammatic representation of an example of an electronic device that includes an ultrasonic sensing system according to some implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a sensor system. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, steering wheels, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automated teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In some implementations, ultrasonic sensor systems include piezoelectric material for the transmission and receiving of ultrasonic waves.

For example, a voltage applied across piezoelectric material corresponding to a transmitter may result in the piezoelectric material stretching or contracting, e.g., being deformed such that the material is strained in response to the applied voltage, resulting in the generation of the ultrasonic wave, as previously discussed. The reflected signals (e.g., the reflected portions of the ultrasonic wave, as previously discussed) may result in the stretching or contracting of piezoelectric material corresponding to a receiver. This results in the generation of a surface charge, and therefore, a voltage across the piezoelectric material that may be used as an electrical output signal representing a portion of raw image data that represents fingerprint image data.

Some implementations of the subject matter described in this disclosure provide circuitry for an ultrasonic sensing system. Features of related ultrasonic sensing techniques are described in U.S. patent application Ser. No. 15/292,057, filed Oct. 12, 2016, owned by the assignee of the present disclosure and entitled "INTEGRATED PIEZOELECTRIC MICROMECHANICAL ULTRASONIC TRANSDUCER PIXEL AND ARRAY", and in U.S. patent application Ser. No. 15/704,337, filed Sep. 14, 2017 owned by the assignee of the present disclosure and entitled "ULTRASONIC TRANSDUCER PIXEL READOUT CIRCUITRY AND METHODS FOR ULTRASONIC PHASE IMAGING", the disclosures of which are hereby incorporated by reference in their entirety into the present application.

In some implementations, the ultrasonic sensing system includes an M×N array of pixels, i.e., M rows by N columns of pixels. In some implementations, values of M and N are each greater than 1000. For example, a 1200×1600 array of nearly two million pixels may be contemplated. As a further example, a 1600×1800 array of nearly three million pixels may be contemplated. It will be appreciated that, assuming a typical pixel spacing on the order of 400-600 pixels per inch, the ultrasonic sensing systems contemplated by the present disclosure can accommodate an imaging area on the order of 5-20 square inches. Such large area ultrasonic sensing systems may be desirable for simultaneous imaging of multiple fingerprints, palm or hand prints, for example.

Some implementations of the subject matter described in this disclosure may be practiced to realize one or more of the following potential advantages. The disclosed techniques introduce small temporal delays between at least portions of outputted receiver signals. As a result, a load on the TFT layer signal traces may be significantly reduced large number of pixels may output receiver signals simultaneously or nearly simultaneously with a result that at least some signals suffer degradation due to limitations of the TFT layer signal traces. In addition, by implementing a sliding range gate window (RGW), timing of the RGW may be controlled so as to compensate for the temporal delays, provide that the RGW window remains well aligned in a desired relationship to returned acoustic signals.

FIG. 1 shows a front view of a diagrammatic representation of an example of an electronic device 100 that includes an ultrasonic sensing system according to some implementations. The electronic device 100 may be representative of, for example, various portable computing devices such as cellular phones, smartphones, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications. Additionally, various implementations described herein are not limited in application to devices that include displays.

In the illustrated implementation, the electronic device 100 includes a housing (or "case") 102 within which various circuits, sensors and other electrical components may be disposed. In the illustrated implementation, the electronic device 100 also includes a display (that may be referred to herein as a "touchscreen display" or a "touch-sensitive display") 104. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The electronic device 100 may include various other devices or components for interacting with, or otherwise communicating information to or receiving information from, a user. For example, the electronic device 100 may include one or more microphones 106, one or more speakers 108, and in some cases one or more at least partially mechanical buttons 110. The electronic device 100 may include various other components enabling additional features such as, for example, one or more video or still-image cameras 112, one or more wireless network interfaces 114 (for example, Bluetooth, WiFi or cellular) and one or more non-wireless interfaces 116 (for example, a universal serial bus (USB) interface or an HDMI interface).

The electronic device 100 may include an ultrasonic sensing system 118 capable of imaging an object signature, such as a fingerprint, palm print or handprint. In some implementations, the ultrasonic sensing system 118 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 118 may function both as a user input button to control the electronic device 100 as well as a sensor to enable security features such as user authentication based on, for example, a fingerprint, palm print or handprint.

Figure 2A:
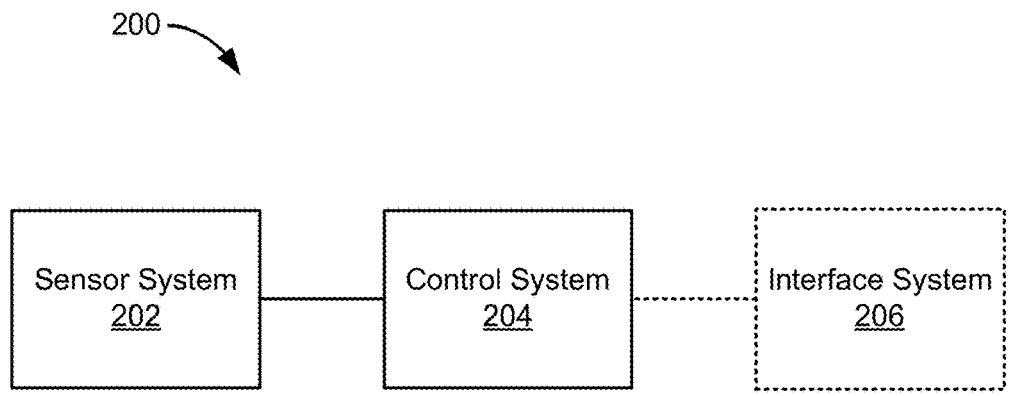
FIG. 2A shows a block diagram representation of components of an example of an ultrasonic sensing system, according to some implementations.

FIG. 2A shows a block diagram representation of components of an example of an ultrasonic sensing system, according to some implementations. In the illustrated implementation, an ultrasonic sensing system 200 includes a sensor system 202 and a control system 204 electrically coupled with the sensor system 202. The sensor system 202 may be capable of scanning a target object and providing raw measured image data usable to obtain an object signature of, for example, a human appendage, such as one or more fingers or toes, a palm, hand or foot. The control system 204 may be capable of controlling the sensor system 202 and processing the raw measured image data received from the sensor system 202. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system 200.

Figure 2B:
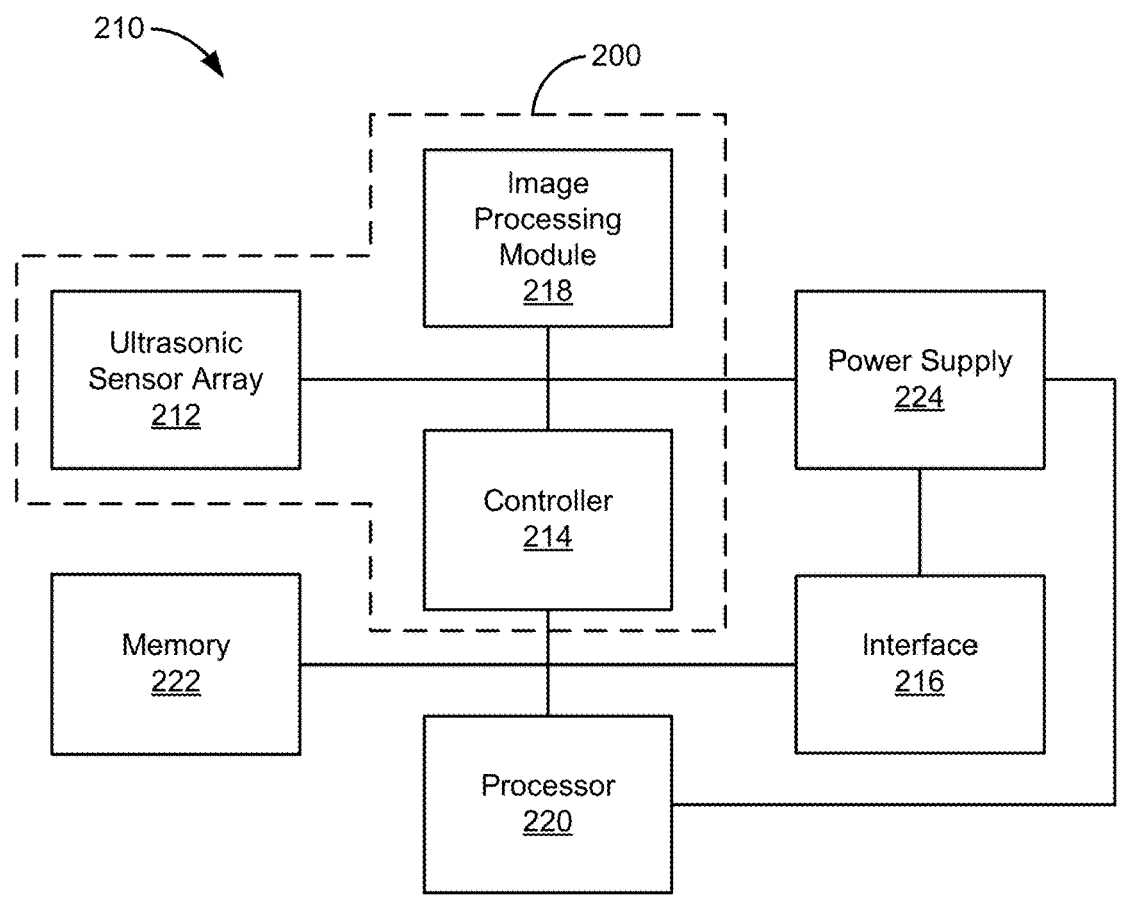
FIG. 2B shows a block diagram representation of components of an example of an electronic device, according to some implementations.

FIG. 2B shows a block diagram representation of components of an example of an electronic device, according to some implementations. In the illustrated example, an electronic device 210 includes the ultrasonic sensing system 200 of FIG. 2A. For example, the electronic device 210 may be a block diagram representation of the electronic device 100 shown in and described with reference to FIG. 1 above. The sensor system 202 of the ultrasonic sensing system 200 of the electronic device 210 may be implemented with an ultrasonic sensor array 212. The control system 204 of the ultrasonic sensing system 200 may be implemented with a controller 214 that is electrically coupled with the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled with the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general purpose processor or a DSP).

In some implementations, in addition to the ultrasonic sensing system 200, the electronic device 210 may include a separate processor 220, a memory 222, an interface 216 and a power supply 224. In some implementations, the controller 214 of the ultrasonic sensing system 200 may control the ultrasonic sensor array 212 and the image processing module 218, and the processor 220 of the electronic device 210 may control other components of the electronic device 210. In some implementations, the processor 220 communicates data to the controller 214 including, for example, instructions or commands. In some such implementations, the controller 214 may communicate data to the processor 220 including, for example, raw or processed image data. It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the electronic device 210.

Depending on the implementation, one or both of the controller 214 and processor 220 may store data in the memory 222. For example, the data stored in the memory 222 may include raw measured image data, filtered or otherwise processed image data, estimated PSF or estimated image data, and final refined PSF or final refined image data. The memory 222 may store processor-executable code or other executable computer-readable instructions capable of execution by one or both of the controller 214 and the processor 220 to perform various operations (or to cause other components such as the ultrasonic sensor array 212, the image processing module 218, or other modules to perform operations), including any of the calculations, computations, estimations or other determinations described herein (including those presented in any of the equations below). It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based Flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the electronic device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the electronic device 210. Additionally or alternatively, the power supply 224 may be wirelessly chargeable.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the ultrasonic sensing system.

Figure 3A:
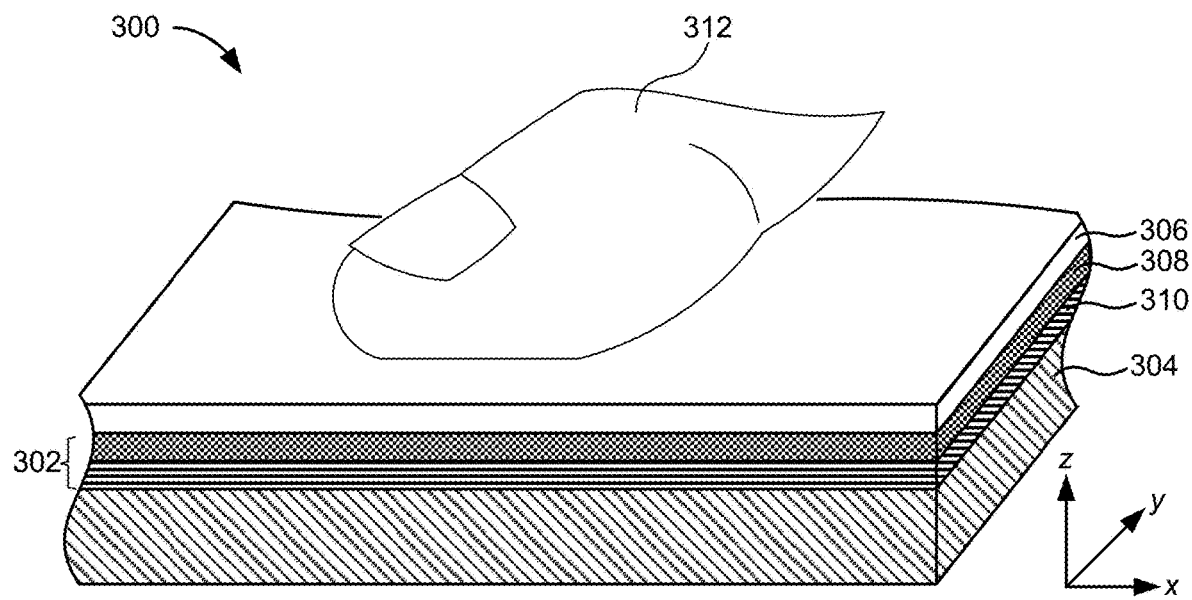
FIG. 3A shows a cross-sectional of an example of an ultrasonic sensing system, according to some implementations.
Figure 3B:
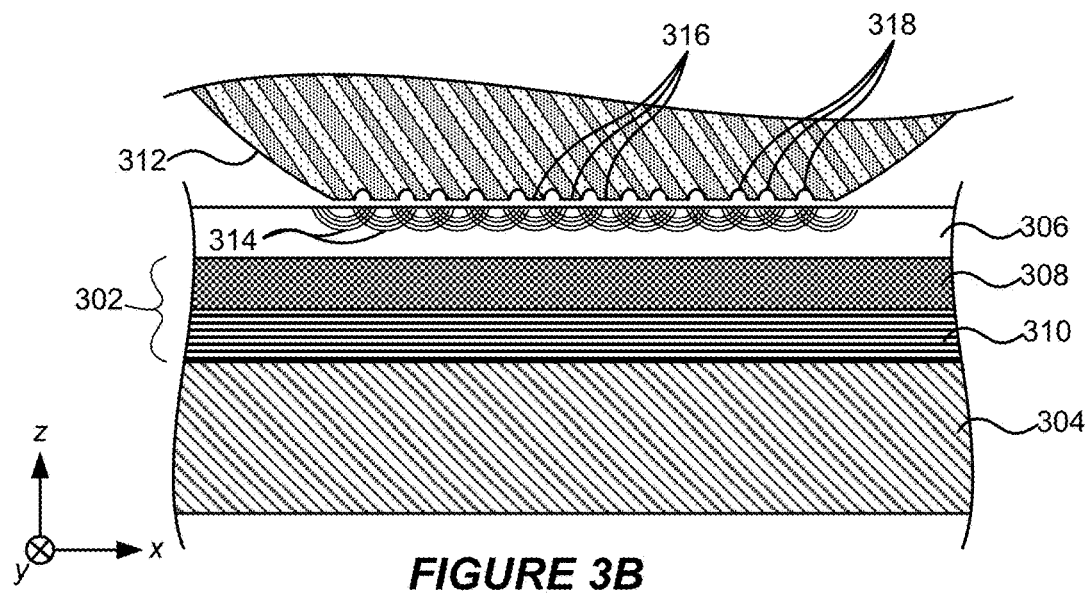
FIG. 3B shows an enlarged cross-sectional side view of the ultrasonic sensing system of FIG. 3A, according to some implementations.

FIG. 3A shows a cross-sectional of an example of an ultrasonic sensing system according to some implementations. FIG. 3B shows an enlarged cross-sectional side view of the ultrasonic sensing system of FIG. 3A according to some implementations. In the illustrated example, the ultrasonic sensing system 300 may implement the ultrasonic sensing system 118 described with reference to FIG. 1 or the ultrasonic sensing system 200 shown and described with reference to FIGS. 2A and 2B. The ultrasonic sensing system 300 may include an ultrasonic transducer 302 that overlies a substrate 304 and that underlies a platen (a "cover plate" or "cover glass") 306. The ultrasonic transducer 302 may include both an ultrasonic transmitter 308 and an ultrasonic receiver 310.

The ultrasonic transmitter 308 may be configured to generate ultrasonic waves towards the platen 306, and a target object 312 positioned on the upper surface of the platen 306. In the illustrated implementation the object 312 is depicted as finger, but any appendage or body part may be contemplated by the present techniques, as well as any other natural or artificial object. In some implementations, the ultrasonic transmitter 308 may more specifically be configured to generate ultrasonic plane waves towards the platen 306. In some implementations, the ultrasonic transmitter 308 includes a layer of piezoelectric material such as, for example, polyvinylidene fluoride (PVDF) or a PVDF copolymer such as PVDF-TrFE. For example, the piezoelectric material of the ultrasonic transmitter 308 may be configured to convert electrical signals provided by the controller of the ultrasonic sensing system into a continuous or pulsed sequence of ultrasonic plane waves at a scanning frequency. In some implementations, the ultrasonic transmitter 308 may additionally or alternatively include capacitive ultrasonic devices.

Figure 4:
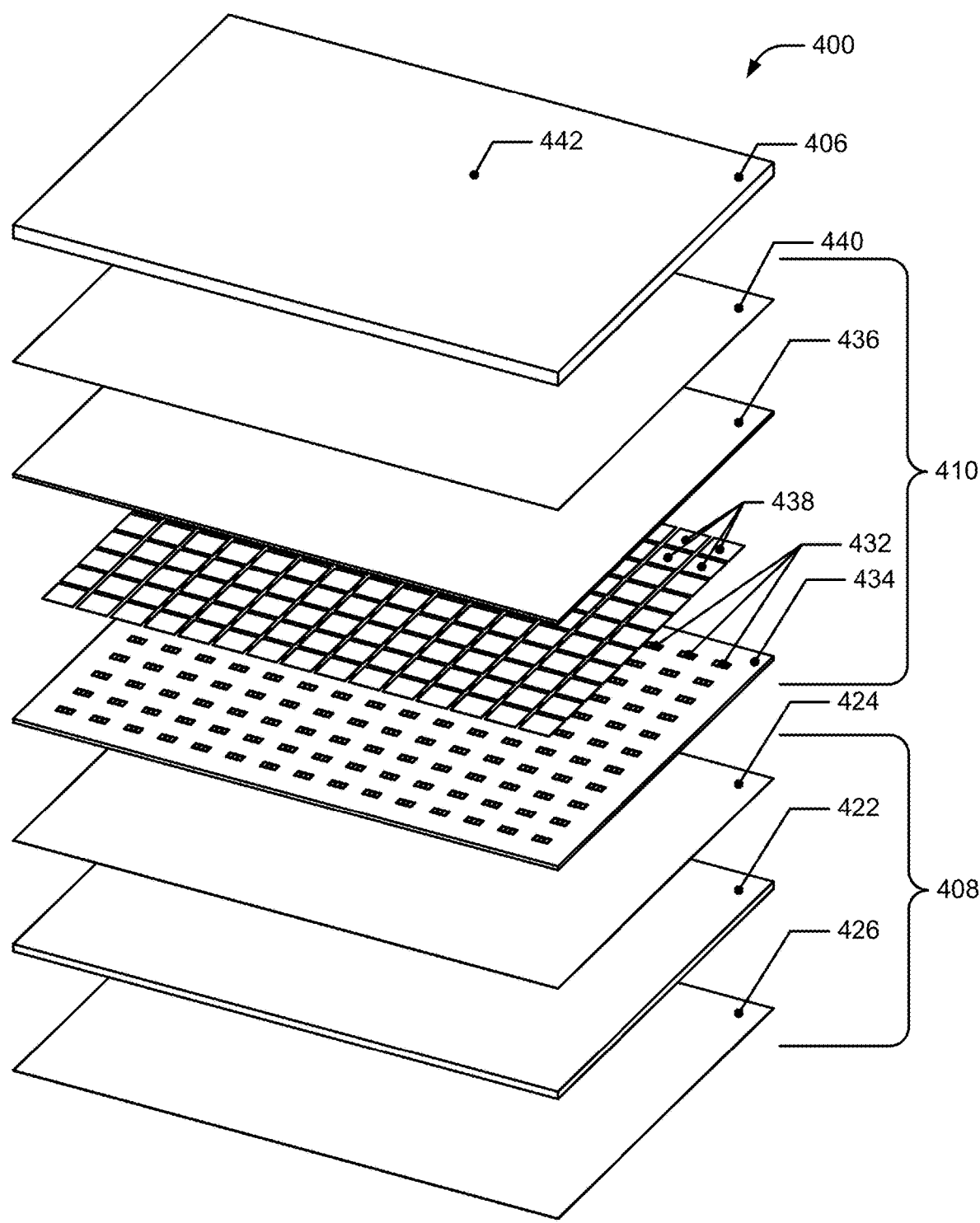
FIG. 4 shows an exploded projection view of an example of components of an example ultrasonic sensing system according to another implementation.

The ultrasonic receiver 310 may be configured to detect ultrasonic reflections 314 resulting from interactions of the ultrasonic waves transmitted by the ultrasonic transmitter 308 with ridges 316 and valleys 318 defining surface texture of the target object 312 being scanned. In some implementations, the ultrasonic transmitter 308 overlies the ultrasonic receiver 310 as, for example, illustrated in FIGS. 3A and 3B. In some other implementations, the ultrasonic receiver 310 may overlie the ultrasonic transmitter 308 (as shown in FIG. 4 described below). The ultrasonic receiver 310 may be configured to generate and output electrical output signals corresponding to the detected ultrasonic reflections. In some implementations, the ultrasonic receiver 310 may include a second piezoelectric layer different than the piezoelectric layer of the ultrasonic transmitter 308. For example, the piezoelectric material of the ultrasonic receiver 310 may be any suitable piezoelectric material such as, for example, a layer of PVDF or a PVDF copolymer. The piezoelectric layer of the ultrasonic receiver 310 may convert vibrations caused by the ultrasonic reflections into electrical output signals. In some implementations, the ultrasonic receiver 310 further includes a thin-film transistor (TFT) layer. In some such implementations, the TFT layer may include an array of sensor pixel circuits configured to amplify the electrical output signals generated by the piezoelectric layer of the ultrasonic receiver 310. The amplified electrical signals provided by the array of sensor pixel circuits may then be provided as raw measured image data to the processing unit for use in processing the image data, identifying a fingerprint associated with the image data, and in some applications, authenticating a user associated with the fingerprint. In some implementations, a single piezoelectric layer may serve as the ultrasonic transmitter 308 and the ultrasonic receiver 310. In some implementations, the substrate 304 may be a glass, plastic or silicon substrate upon which electronic circuitry may be fabricated. In some implementations, an array of sensor pixel circuits and associated interface circuitry of the ultrasonic receiver 310 may be configured from CMOS circuitry formed in or on the substrate 304. In some implementations, the substrate 304 may be positioned between the platen 306 and the ultrasonic transmitter 308 and/or the ultrasonic receiver 310. In some implementations, the substrate 304 may serve as the platen 306. One or more protective layers, acoustic matching layers, anti-smudge layers, adhesive layers, decorative layers, conductive layers or other coating layers (not shown) may be included on one or more sides of the substrate 304 and the platen 306.

The platen 306 may be formed of any suitable material that may be acoustically coupled with the ultrasonic transmitter 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner. In some implementations, the platen 306 may have a thickness in the range of about 10 microns (μm) to about 1000 μm or more.

FIG. 4 shows an exploded projection view of an example of components of an example ultrasonic sensing system according to another implementation. In the illustrated implementation, the ultrasonic sensing system 400 includes an ultrasonic transmitter 408. The ultrasonic transmitter 408 may include a substantially planar piezoelectric transmitter layer 422 capable of functioning as a plane wave generator. Ultrasonic waves may be generated by applying a voltage across the piezoelectric transmitter layer 422 to expand or contract the layer, depending upon the voltage signal applied, thereby generating a plane wave. In this example, the processing unit (not shown) is capable of causing a transmitter excitation voltage to be applied across the piezoelectric transmitter layer 422 via a first transmitter electrode 424 and a second transmitter electrode 426. The first and second transmitter electrodes 424 and 426 may be metallized electrodes, for example, metal layers that coat opposing sides of the piezoelectric transmitter layer 422. As a result of the piezoelectric effect, the applied transmitter excitation voltage causes changes in the thickness of the piezoelectric transmitter layer 422, and in such a fashion, generates ultrasonic waves at the frequency of the transmitter excitation voltage.

The ultrasonic waves may travel towards an object to be imaged ("target object", not illustrated), passing through the platen 406. A portion of the ultrasonic waves not absorbed or transmitted by the target object may be reflected back through the platen 406 and received by the ultrasonic receiver 410, which, in the implementation illustrated in FIG. 4, overlies the ultrasonic transmitter 408. The ultrasonic receiver 410 may include an array of sensor pixel circuits 432 disposed on a substrate 434 and a piezoelectric receiver layer 436. In some implementations, each sensor pixel circuit 432 may include one or more TFT or CMOS transistor elements, electrical interconnect traces and, in some implementations, one or more additional circuit elements such as diodes, capacitors, and the like. Each sensor pixel circuit 432 may be configured to convert an electric charge generated in the piezoelectric receiver layer 436 proximate to the pixel circuit into an electrical signal. Each sensor pixel circuit 432 may include a pixel input electrode 438 that electrically couples the piezoelectric receiver layer 436 to the sensor pixel circuit 432.

In the illustrated implementation, a receiver bias ($R_{bias}$) electrode 440 is disposed on a side of the piezoelectric receiver layer 436 proximal to the platen 406. The $R_{bias}$ electrode 440 may be a metallized electrode and may be grounded or biased to control which signals may be passed to the array of sensor pixel circuits 432. Ultrasonic energy that is reflected from the exposed (upper/top) surface 442 of the platen 306 may be converted into localized electrical charges by the piezoelectric receiver layer 436. These localized charges may be collected by the pixel input electrodes 438 and passed on to the underlying sensor pixel circuits 432. The charges may be amplified or buffered by the sensor pixel circuits 432 and provided to the processing unit. The processing unit may be electrically connected (directly or indirectly) with the first transmitter electrode 424 and the second transmitter electrode 426, as well as with the $R_{bias}$ electrode 440 and the sensor pixel circuits 432 on the substrate 434. In some implementations, the processing unit may operate substantially as described above. For example, the processing unit may be capable of processing the signals received from the sensor pixel circuits 432.

Some examples of suitable piezoelectric materials that can be used to form the piezoelectric transmitter layer 422 or the piezoelectric receiver layer 436 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be utilized include polyvinylidene chloride (PVDC) homopolymers and copolymers, polytetrafluoroethylene (PTFE) homopolymers and copolymers, and diisopropylammonium bromide (DIPAB).

In some implementations, at least elements of ultrasonic receiver 410 may be co-fabricated with sensor pixel circuits 432 configured as thin-film transistor (TFT) circuitry or CMOS circuitry on or in the same substrate, which may be a silicon, SOI, glass or plastic substrate, in some examples. For example, a TFT substrate may include row and column addressing electronics, multiplexers, local amplification stages and control circuitry.

Figure 5:
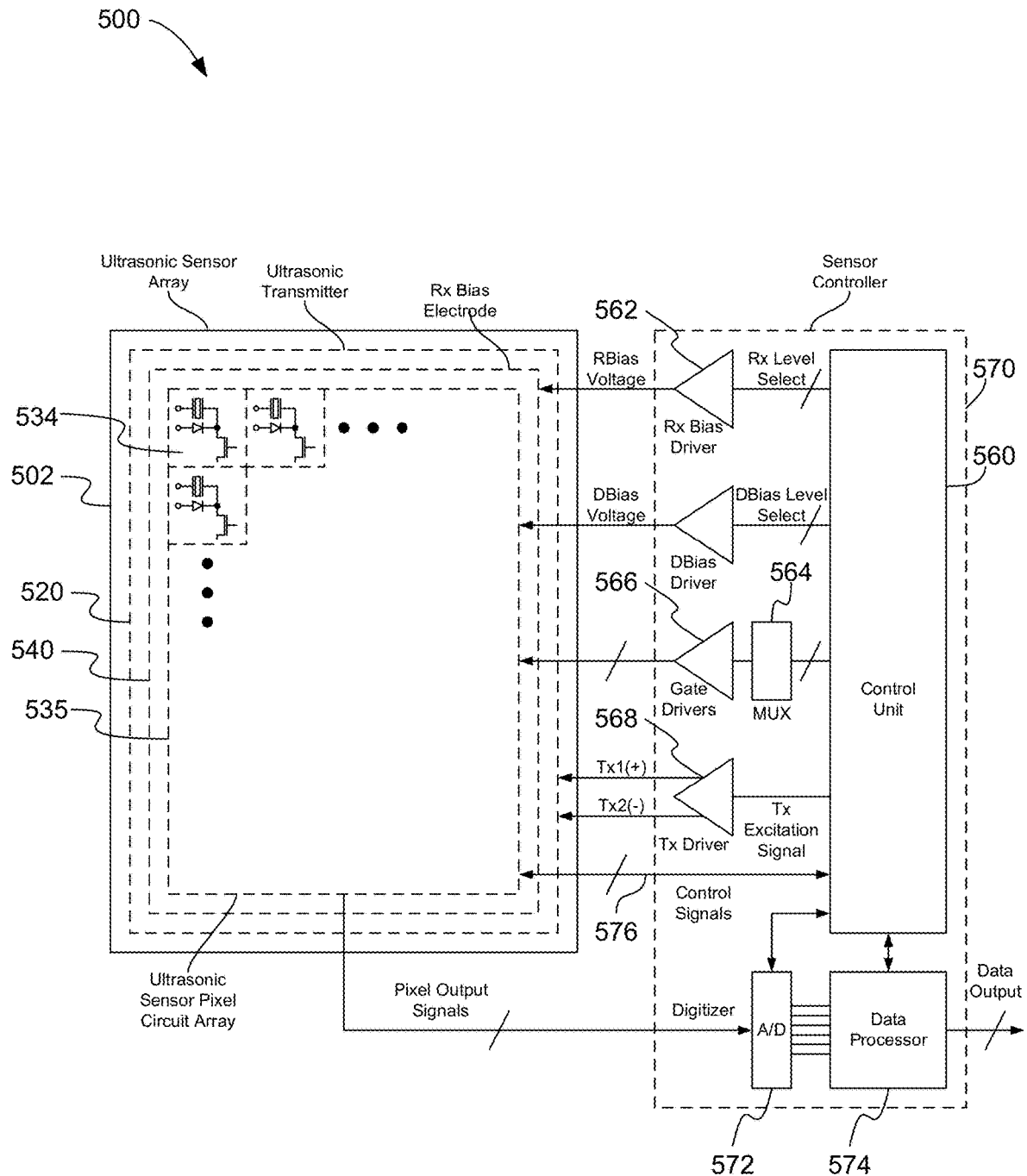
FIG. 5 illustrates a block diagram of an ultrasonic sensor system, according to an implementation.

FIG. 5 illustrates a block diagram of an ultrasonic sensor system, according to an implementation. The ultrasonic sensor system 500 may include an ultrasonic sensor array 502 that includes an ultrasonic transmitter 520, an ultrasonic sensor pixel circuit array 535 and an Rx bias electrode 540. The ultrasonic transmitter 520 may be electrically coupled with a transmitter driver ("Tx driver") 568. In some implementations, the Tx driver 568 may have a positive polarity output signal (Tx1(+)) and a negative polarity output signal (Tx2(−)) electrically coupled with one or more transmitter electrodes associated with the ultrasonic transmitter 520. The Tx driver 568 may be electrically coupled with a control unit 560 of a sensor controller 570. The control unit 560 may be configured to control various aspects of the sensor system 500, e.g., ultrasonic transmitter timing and excitation waveforms, bias voltages, pixel addressing, signal filtering and conversion, readout frame rates, and so forth. The control unit 560 may provide one or more transmitter excitation signals to the Tx driver 568. The control unit 560 may be electrically coupled with a receiver (Rx) bias driver 562 through, for example, an Rx level select input bus. The Rx bias driver 562 may provide an RBias voltage to the Rx bias electrode 540. The control unit 560 may be electrically coupled with one or more demultiplexers 564. The demultiplexers 564 may be electrically coupled with a plurality of gate drivers 566. The gate drivers 566 may be electrically coupled with the sensor pixel circuit array 535 of the ultrasonic sensor array 502. The gate drivers 566 may be positioned external to the sensor pixel circuit array 535, in some implementations. In other implementations, the gate drivers 566 may be included on a common substrate with the sensor pixel circuit array 535. The demultiplexers 564, which may be external to or included on a common substrate with the sensor pixel circuit array 535, may be used to select specific gate drivers 566. The gate drivers 566 may select one or more rows or columns of the sensor pixel circuit array 535. The sensor pixel circuit array 535, which, in the illustrated implementation, includes a number of individual ultrasonic sensor pixels 534, may be electrically coupled with one or more digitizers 572. The digitizers 572 may convert analog pixel output signals from one or more of the individual sensor pixels 534 to digital signals suitable for further processing within a data processor 574. The data processor 574 may be included (as illustrated) in the sensor controller 570. In other implementations, the data processor 574 may be external to the sensor controller 570. In the illustrated implementation, the sensor controller 570 may include one or more data processors 574 that receive data from the sensor pixel circuit array 535. The sensor controller 570 may provide data outputs to an external system or processor, such as an applications processor of a mobile device. The data processor 574 may translate the digitized data into image data of a fingerprint or format the data for further processing.

Each ultrasonic sensor pixel 534 may include a PMUT element that may serve as an ultrasonic receiver and/or an ultrasonic transmitter. Each sensor pixel 534 may also include a sensor pixel circuit that is associated with the PMUT element. The associated PMUT element may overlay each sensor pixel circuit, that is, the associated PMUT element and the sensor pixel circuit may be included within a common footprint area. Advantageously, the sensor pixel circuit may be contained in a footprint area that is no larger than a footprint area of the PMUT element. In some implementations, the ultrasonic transmitter 520 may include a layer of piezoelectric material sandwiched between two transmitter electrodes and positioned above or below the ultrasonic sensor pixel circuit array 535.

The ultrasonic transmitter 520 may be electrically coupled to and driven by the transmitter excitation signals by way of the Tx driver 568 to generate and launch ultrasonic waves. In some implementations, the transmitter excitation signals may be coupled to one or more electrodes in each PMUT or PMUT array, such as a transmit electrode associated with each PMUT, to allow the generation and launching of ultrasonic waves. In some implementations, the PMUTs in the PMUT array may be provided with a transmitter excitation signal that may be applied in common to some or all of the transmit electrodes in the PMUT array to launch a substantially plane ultrasonic wave.

In some implementations, the control unit 560 may be configured to send a Tx excitation signal to a Tx driver 568 at regular intervals so as to cause the Tx driver 568 to excite the ultrasonic transmitter 520 and produce one or more ultrasonic waves. The control unit 560 may also be configured to send level select input signals through the Rx bias driver 562 to bias the Rx bias electrode 539 and allow gating for ultrasonic signal detection by the ultrasonic sensor pixels 534. One or more of the demultiplexers 564 may be used to turn on and off the gate drivers 566 that cause a particular row or column of the sensor pixel circuit array 535 to provide pixel output signals. Output signals from the sensor pixel circuit array 535 may be sent through a charge amplifier, a filter such as a resistor-capacitor (RC) filter or an anti-aliasing filter, and the digitizer 572 to the data processor 574. One or more control lines 576 may carry control signals between the sensor controller 570 and the ultrasonic sensor array 502.

Figure 6:
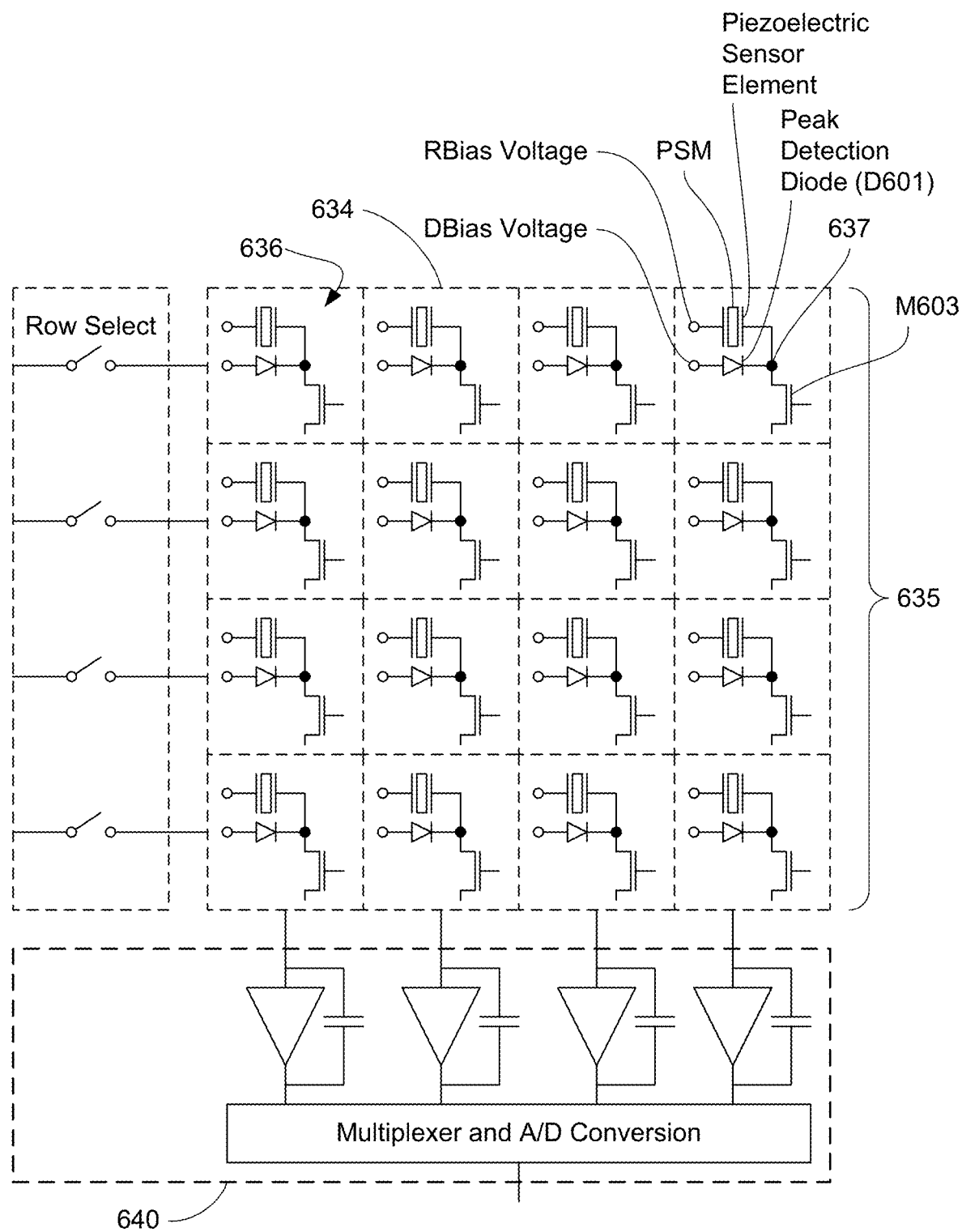
FIG. 6 illustrates a simplified block diagram of a sensor pixel array coupled with pixel readout electronics.

FIG. 6 illustrates a simplified block diagram of a sensor pixel array coupled with pixel readout electronics. In the illustrated implementation, an ultrasonic sensor pixel array 635 includes sixteen ultrasonic sensor pixels 634 arranged in a 4×4 array for an ultrasonic sensor. Each sensor pixel 634 may be associated with a local region of piezoelectric sensor material (PSM) and may include a sensor pixel circuit 636 that includes a peak detection diode D601 and a readout transistor M603. Many or all of these elements may be formed on or in a common substrate to form each sensor pixel circuit 636. In operation, the local region of PSM of each sensor pixel 634 may transduce received ultrasonic energy into electrical charges. The peak detection diode D601 may register the maximum amount of charge (the "peak charge") detected by the local region of PSM. Each row of the pixel circuit array 635 may then be scanned, e.g., through a row select mechanism, a gate driver, or a shift register. Each readout transistor M603 may be triggered to allow the magnitude of the peak charge for each sensor pixel 634 to be read by additional circuitry, e.g., a multiplexer and an A/D converter of pixel readout electronics 640. The sensor pixel circuit 636 may include one or more TFTs (not illustrated) to allow gating, addressing, and resetting of the sensor pixel 634. Each sensor pixel 634 may include a PMUT element that may serve as an ultrasonic receiver and/or an ultrasonic transmitter. Each PMUT element in a PMUT sensor array may be associated with a respective sensor pixel circuit 636 in the sensor pixel circuit array 635. Pixel input electrode 637 of the sensor pixel circuit 636 may be used to make electrical connection with one or more electrodes in an overlying PMUT element.

Each sensor pixel circuit 636 may provide information about a small portion of the object detected by an ultrasonic sensor system such as, for example, ultrasonic sensor system 500 described in connection with FIG. 5. While, for convenience of illustration, the example shown in FIG. 4 is of a simple 4×4 array, ultrasonic sensors having a resolution on the order of 500 pixels per inch or higher may be configured with an appropriately scaled structure. The detection area of the ultrasonic sensor system 500 may be selected depending on the intended target object. For example, the detection area may range from about 5 mm×5 mm for a single finger to about 80 mm×80 mm for four fingers. Smaller and larger areas, including square, rectangular and non-rectangular geometries, may be used as appropriate, depending on characteristics of the target object.

In some implementations that particularly benefit from the presently disclosed techniques, a detection area may be 6000 square millimeters or greater and include one to five million PMUTs, for example. Such large area ultrasonic sensors may be configured to image multiple fingers simultaneously and/or image palm prints, entire hands, or similarly sized artificial or natural objects. In the absence of the presently disclosed techniques, the TFT layer signal traces may be unable to accommodate simultaneous operation of such a large number of PMUTs. More particularly, receiver signal outputs, resulting from localized electrical charges generated by the piezoelectric receiver layer and collected by the pixel input electrodes, may be degraded when a very large number of PMUT receivers are operating simultaneously.

To mitigate the above-mentioned problem, in some implementations, a temporal phasing is employed so as to avoid simultaneously outputting an excessive number of receiver signals. For example, in some implementations, an ultrasonic pulse may be produced by starting and stopping the transmitters of PMUT array during a short interval of time (e.g. less than 1 microsecond). In such implementations, acoustic signals returned to the PMUT array (resulting from interaction with, for example, a target object) may be temporally phased so that PMUT receivers at different locations in the array receive the returned acoustic signals at different times. Alternatively or in addition, the ultrasonic pulses outputted by the PMUT transmitters may be temporally phased.

Figure 7:
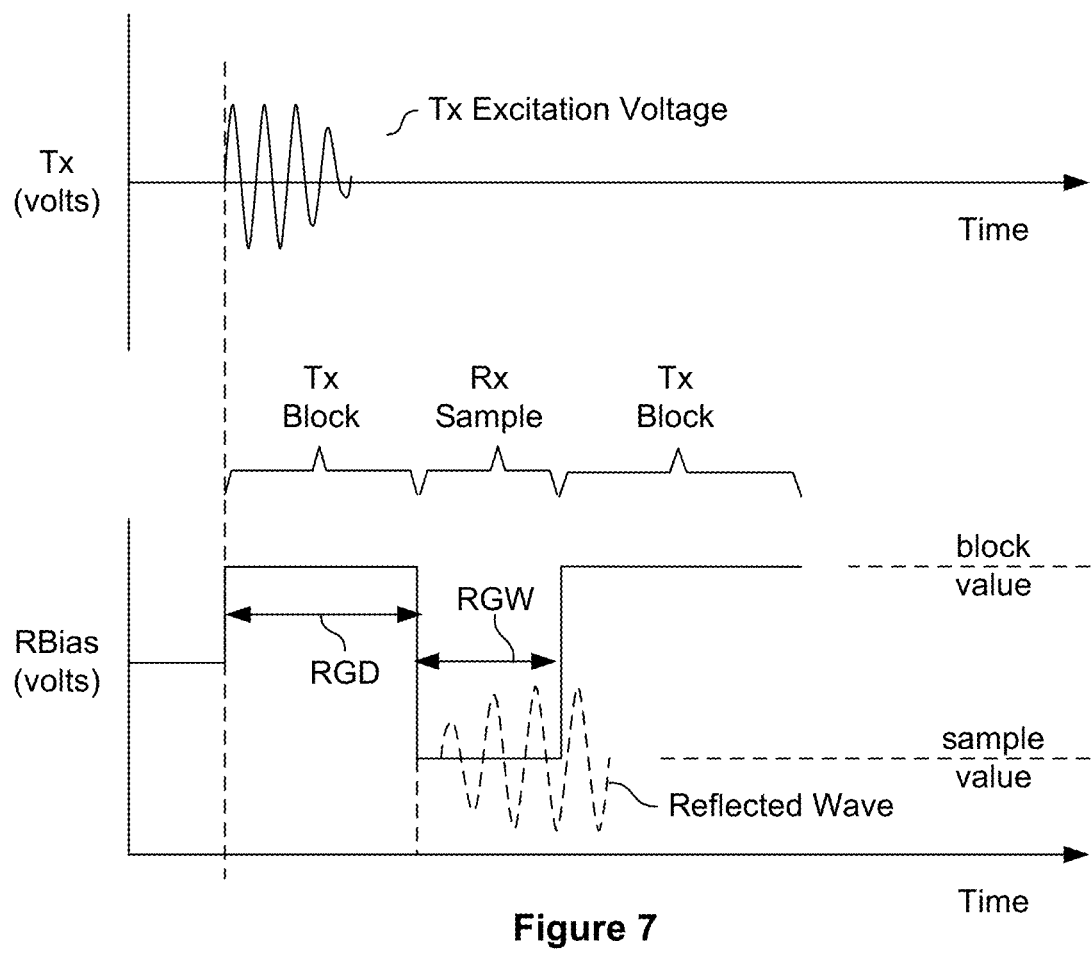
FIG. 7, graphically illustrates an example of transmitter excitation signals and receiver bias voltage levels as a function of time.

Features and benefits of the disclosed techniques may be better appreciated by referring to FIG. 7, which graphically illustrates an example of transmitter excitation signals and receiver bias voltage levels as a function of time. The transmitter excitation signals (upper graph) may be provided to an ultrasonic transmitter, whereas the receiver bias voltage (lower graph) may be applied to an RBias electrode of an ultrasonic sensor element. For example bias voltage levels may be applied to the RBias electrode 440 (FIG. 4) or 540 (FIG. 5) of an ultrasonic sensor array. One or more cycles of an ultrasonic transmitter excitation signal may be applied to the ultrasonic transmitter, as shown in the upper graph of FIG. 7. In some implementations, a single transmitter excitation cycle may be used. In some implementations, as illustrated, multiple excitation cycles may be used, such as two cycles, three cycles, four cycles, five cycles or more. The transmitter excitation signals in some implementations may be square waves, rectangular waves, partial waves, pulsed waves, multiple-frequency waves, chirped waves, low or high duty-cycle waves, variable-amplitude waves, variable-frequency waves, or other suitable waveform for driving an ultrasonic transmitter (e.g., ultrasonic transmitter 408 of FIG. 4 or ultrasonic transmitter 520 of FIG. 5). During a first portion of time ("Tx Block") when transmission of the outgoing ultrasonic wave is occurring, the bias voltage applied to the RBias electrode may correspond to a "block value" such that the receiver bias electrode prevents signals reflected from outgoing transmitted waves from being captured by a sensor pixel circuit (e.g., sensor pixel circuit 636 of FIG. 6).

During a subsequent portion of time ("Rx Sample"), the bias level of the control signal applied to the RBias electrode is set to a "sample value" and the reflected ultrasonic signals may be captured a sensor pixel. The Rx Sample period may start upon completion of a range gate delay ("RGD") period. The RGD period may typically be less than one microsecond. In some implementations, the RGD period may be about 500 nanoseconds. The duration of the Rx sample period may be referred to as the range gate window ("RGW") period. The RGW period may typically be less than one microsecond. In some implementations, the RGW period may be in the range of about 200 to 1000 nanoseconds. To prevent detection of unwanted internal reflections, the bias level applied to the receiver bias electrode may be brought back to the block value upon completion of the RGW period. The RGW period, in the illustrated implementation, may correspond to a time interval that is roughly similar to the period of a transmitter excitation cycle. In other implementations, the RGW period may be shorter or longer than the period of the transmitter excitation cycle. During RGW period, the sensor pixel may be said to be in a "read mode" of operation. During or near the RGW period, the receiver may output signals, resulting from or corresponding to localized electrical charges generated by the piezoelectric receiver layer and collected by the pixel input electrodes.

In the absence of the presently disclosed techniques, each of a large number of pixels may output receiver signals simultaneously or nearly simultaneously with a result that at least some signals suffer degradation due to limitations of the TFT layer signal traces. To mitigate this problem, the present disclosure contemplates introducing small temporal delays between at least portions of the outputted receiver signals. As a result, a load on the TFT layer signal traces may be significantly reduced.

Figure 8:
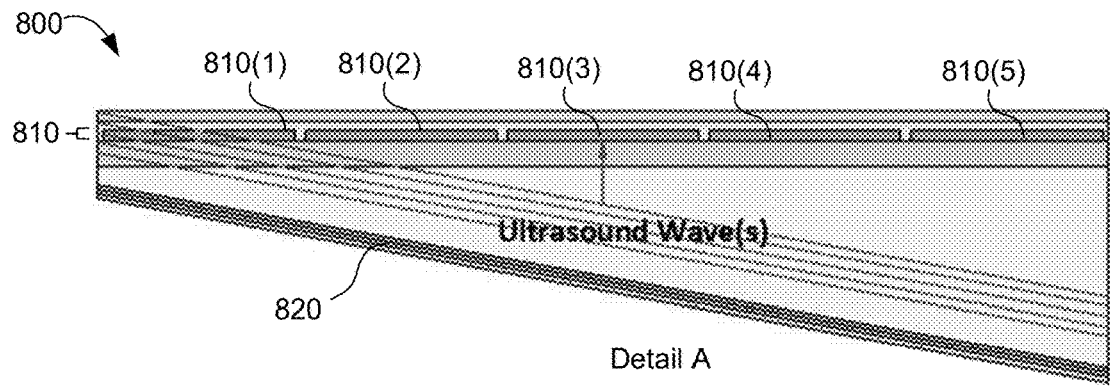
FIG. 8 illustrates an example of temporal phasing of receiver output signals, according to an implementation.
Figure 8:
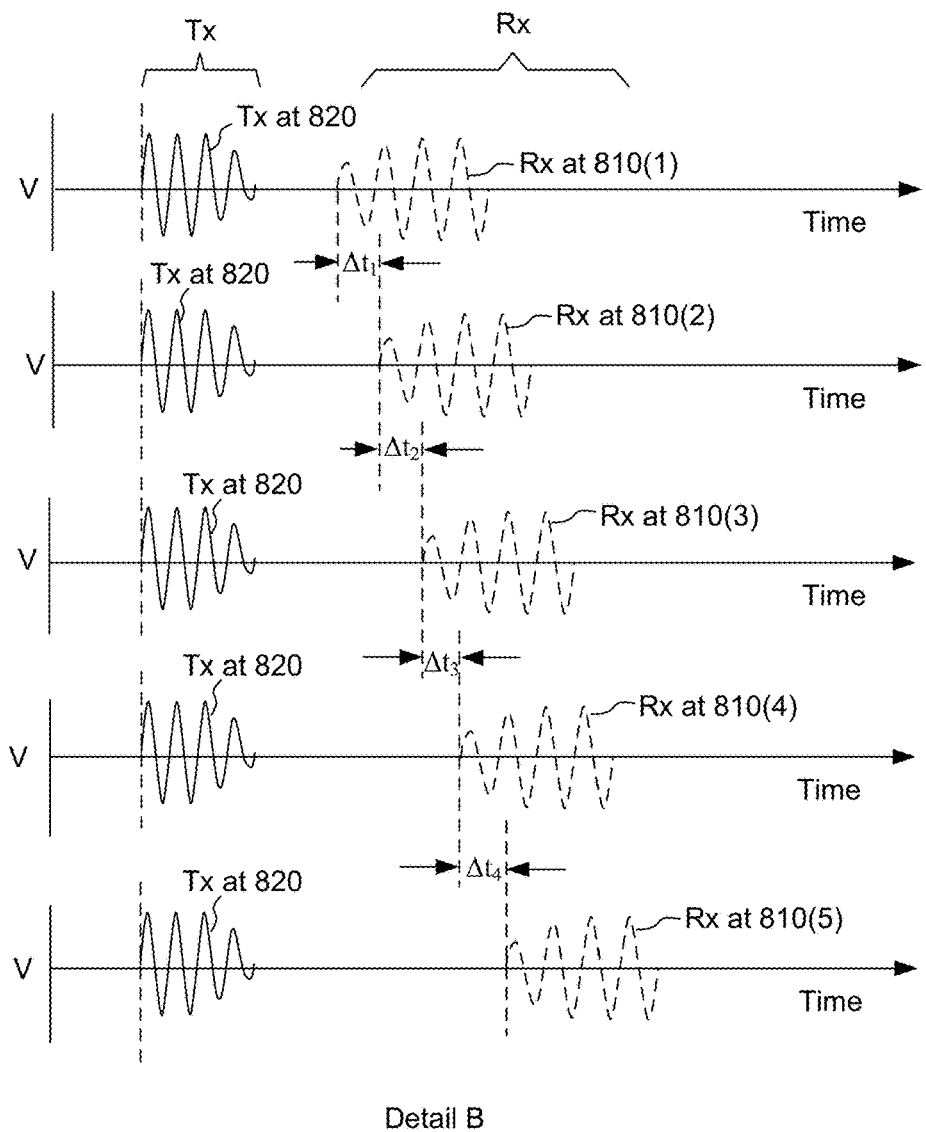

FIG. 8 illustrates an example of temporal phasing of receiver output signals, according to an implementation. Referring first to Detail A, a conceptual cutaway view of an ultrasonic sensor system 800 is illustrated, according to an implementation. The ultrasonic sensor system 800 includes an array layer 810 of receivers and an array layer 820 of transmitters. In order to introduce a delay between the time ultrasound waves are received at each of portions 810(1), 810(2), 810(3), 810(4), 810(5), a physical characteristic of a stack of layers in the ultrasonic sensor system 800 is changed in the regions between transmitter array 820 and the portions 810(1), 810(2), 810(3), 810(4), 810(5), where the change in physical characteristic results in a propagation delay in the ultrasound signal before being received at each of portions 810(1), 810(2), 810(3), 810(4), 810(5). In the illustrated implementation, the array layer 820 is not parallel with the array layer 810. As a result, the separation distance between receivers of array 810 and the array 820 is not uniform. Hence, in the illustrated implementation, the physical characteristic that is changed in each region between transmitter array 820 and each of portions 810(1), 810(2), 810(3), 810(4), 810(5) is the physical distance between transmitter array 820 and each of 810(1), 810(2), 810(3), 810(4), 810(5). The variation in physical distance results in a delay in the reception of the ultrasound wave signal at each of portions 810(1), 810(2), 810(3), 810(4), 810(5) after the signal has reflected off of the platen surface. More particularly, the separation between a first portion 810(1) of receivers in array 810 and the array 820 is smaller than the separation between a second portion 810(2) of receivers in array 810 and the array 820. Similarly: the separation between the second portion 810(2) of receivers and the array 820 is smaller than the separation between a third portion 810(3) of receivers and the array 820; the separation between the third portion 810(3) of receivers and the array 820 is smaller than the separation between a fourth portion 810(4) of receivers and the array 820; and the separation between the fourth portion 810(4) of receivers and the array 820 is smaller than the separation between a fifth portion 810(5) of receivers and the array 820. As a result, and as illustrated in Detail B, acoustic signals, that may be launched simultaneously by the array 820 reach different portions 810($i$) of the array of receivers at different times. Each portion 810($i$) may correspond to a number of pixel elements. For example, in some implementations, each portion 810($i$) includes a number of rows of pixel elements. In the illustrated example, if the ultrasonic array 800 includes an M×N array of 'M' rows and 'N' columns, each portion 810($i$) may include approximately m/5 rows. In other implementations, each portion 810($i$) may include approximately m/10 or m/20 rows, for example.

In the example implementation illustrated in Detail A, a wedge shaped delay line is obtained by a correspondingly wedge-shaped acoustic layer 830 that defines a linearly varying distance between the array 810 and the array 820. The acoustic layer 830 may be composed of a glass or plastic for example. It will be appreciated that an acoustic layer may be configured in other shapes than the illustrated wedge-shaped configuration to provide non-uniform separation between an array of receivers and an array of transmitters. For example, a stair step arrangement, or a curvilinear configuration may be contemplated. Referring now to Detail B, it may be observed that a temporal delay is established in the reception of acoustic signals at adjacent portions of the array 810. For example, the temporal delay between reception of acoustic signals at the first portion 810(1) and the second portion 810(2) is $\Delta t_1$. Similarly: the temporal delay between reception of acoustic signals at the second portion 810(2) and the third portion 810(3) is $\Delta t_2$; the temporal delay between reception of acoustic signals at the third portion 810(3) and the fourth portion 810(4) is $\Delta t_3$; and the temporal delay between reception of dammit acoustic signals at the fourth portion 810(4) and the fifth portion 810(5) is $\Delta t_4$. The temporal delays $\Delta t_1$, $\Delta t_2$, $\Delta t_3$, and $\Delta t_4$ may be in the range of a few tens to hundreds of nanoseconds. In an implementation, temporal delays may be 5-10% of the transmitter excitation cycle duration, for example, or about 25-50 nanoseconds. In some implementations, $\Delta t_1$, $\Delta t_2$, $\Delta t_3$, and $\Delta t_4$ may be approximately equal, but this is not necessarily so. Although the physical characteristic for introducing a delay in propagation time for the ultrasound signal that was varied in the illustrated embodiment of FIG. 8 was a physical distance between transmitter array 820 and portions 810(1), 810(2), 810(3), 810(4), 810(5), it is understood that the physical distance could remain constant (i.e., transmitter array 820 and receiver array 810 could be parallel), and another physical characteristic of one or more layers in the stack in each region between the transmitter array 820 and each of portions 810(1), 810(2), 810(3), 810(4), 810(5) could alternatively be changed in order to introduce the propagation delay. For example, the physical characteristic for introducing a delay in propagation time for the ultrasound signal can also include any physical characteristic capable of affecting the speed of the ultrasonic signal in the stack of layers between transmitter array and each of portions 810(1), 810(2), 810(3), 810(4), 810(5), including for example, the elasticity of one or more materials (such as by changing, for example, the bulk modulus or Young's modulus) in the stack, the density of one or more materials in the stack, and/or the number of interfaces the stack. For example, glass can be doped to have different speeds of sound within it. Hence, the glass between the transmitter array 820 and each of portions 810(1), 810(2), 810(3), 810(4), 810(5) could be doped differently (or could otherwise comprise different materials each) such that even if transmitter array 820 and receiver array 810 are parallel, each of portions 810(1), 810(2), 810(3), 810(4), 810(5) would receive the ultrasound signal at a different time from the other portions.

Alternatively or in addition to providing a non-uniform separation between an array of receivers and an array of transmitters, the array of transmitters may be segmented, and a temporal delay provided between transmission of acoustic signals from adjacent segments.

Figure 9:
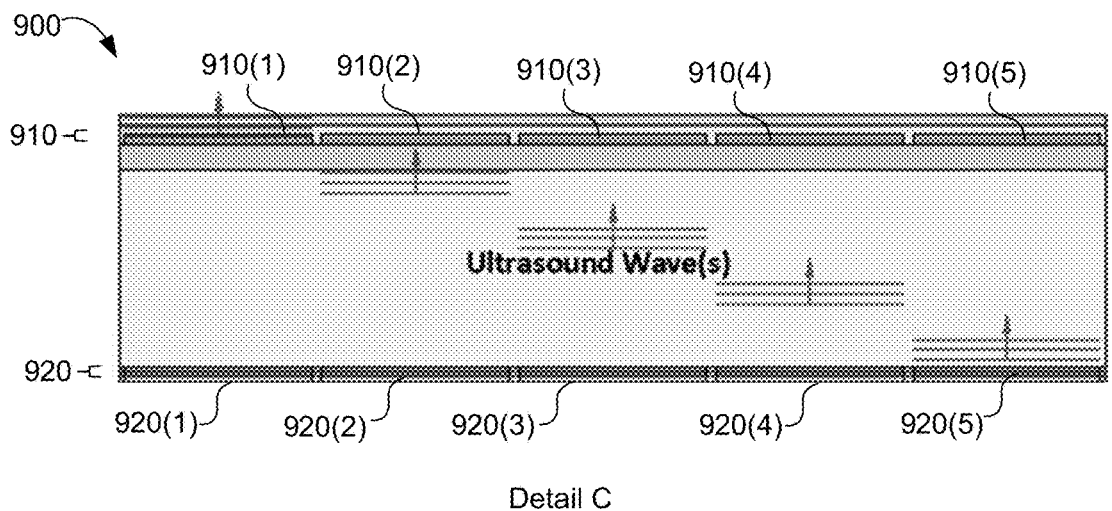
FIG. 9 illustrates an example of temporal phasing of transmission and reception of acoustic signals, according to an implementation.
Figure 9:
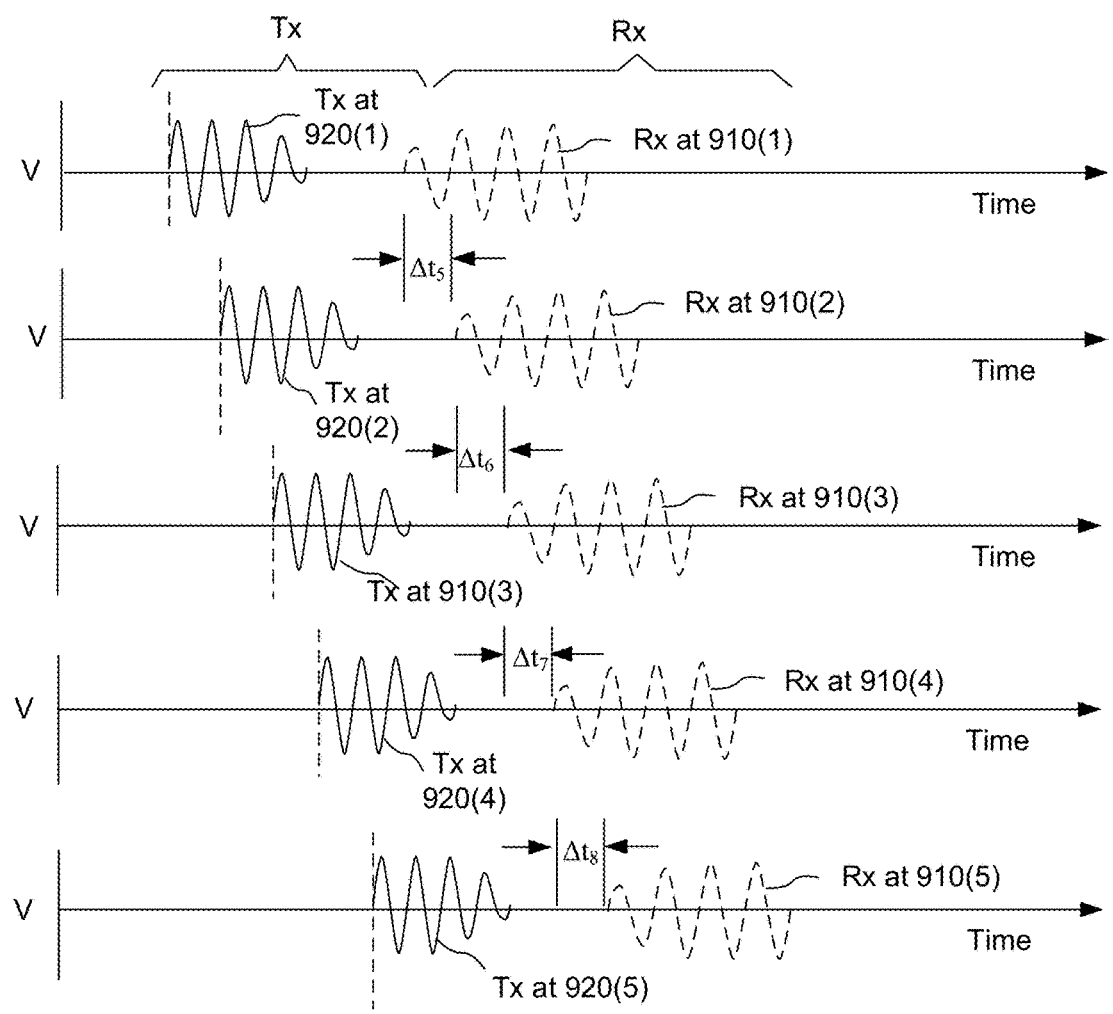

FIG. 9 illustrates an example of temporal phasing of transmission and reception of acoustic signals, according to an implementation. Referring first to Detail C, a conceptual cutaway view of an ultrasonic sensor system 900 is illustrated, according to an implementation. The ultrasonic sensor system 900 includes an array 910 of receivers and an array 920 of transmitters. In the illustrated implementation, the array 920 is approximately parallel with the array 910, but this is not necessarily so.

The array 920 of transmitters is segmented into separately controlled portions 920($i$) that may be configured to undergo, non-simultaneous transmitter excitation cycles. As a result, and as illustrated in Detail D, acoustic signals may be launched at different times from each portion 920($i$). As a result, acoustic signals reach portions 910($i$) of the array of receivers at different times. Each portion 910($i$) may correspond to a number of pixel elements. For example, in some implementations, each portion 910($i$) includes a number of rows of pixel elements. In the illustrated example, if the ultrasonic array 900 includes an M×N array of 'M' rows and 'N' columns, each portion 910($i$) may include approximately m/5 rows. In other implementations, each portion 910($i$) may include approximately m/10 or m/20 rows, for example.

Referring now to Detail D, it may be observed that a temporal delay is established in the reception of acoustic signals at adjacent portions of the array 910. For example, the temporal delay between reception of acoustic signals at the first portion 910(1) and the second portion 910(2) is $\Delta t_5$. Similarly: the temporal delay between reception of acoustic signals at the second portion 910(2) and the third portion 910(3) is $\Delta t_6$; the temporal delay between reception of acoustic signals at the third portion 910(3) and the fourth portion 910(4) is $\Delta t_7$; and the temporal delay between reception of acoustic signals at the fourth portion 910(4) and the fifth portion 910(5) is $\Delta t_8$. The temporal delays $\Delta t_5$, $\Delta t_6$, $\Delta t_7$, and $\Delta t_8$ may be in the range of a few tens to hundreds of nanoseconds. In an implementation, temporal delays may each be 5-10% of the transmitter excitation cycle duration, for example, or about 25-50 nanoseconds. In some implementations, $\Delta t_5$, $\Delta t_6$, $\Delta t_7$, and $\Delta t_8$ may be approximately equal, but this is not necessarily so.

Figure 10:
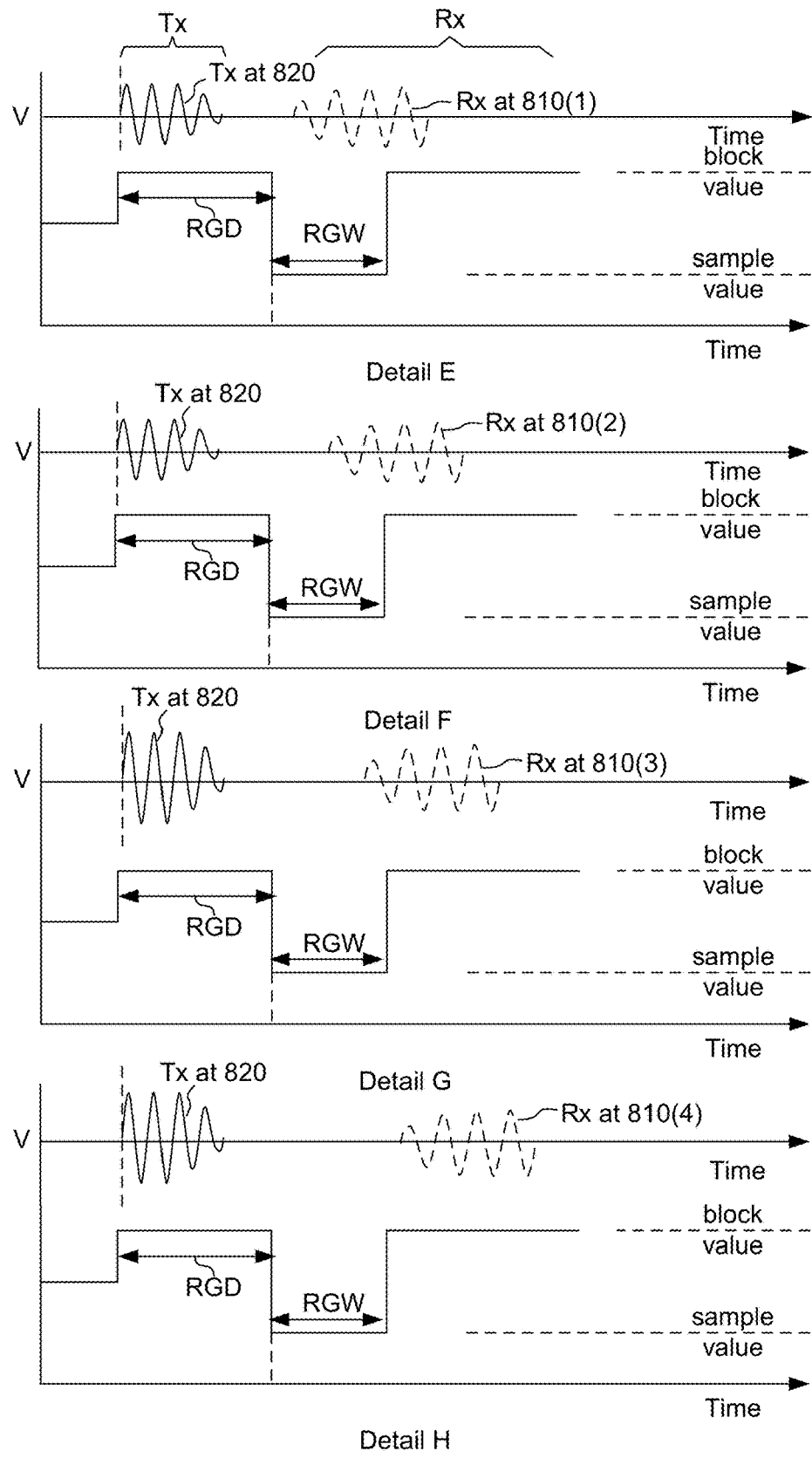
FIG. 10 graphically illustrates an example of transmitter excitation signals and receiver bias voltage levels as a function of time.

As indicated above, in connection with FIG. 7, a range gate window (RGW) may be established by setting an Rbias voltage level to a sample value. A sensor controller (e.g. sensor controller 570 of FIG. 5) may be configured to set the Rbias voltage level to the sample value. FIG. 10 graphically illustrates an example of transmitter excitation signals and receiver bias voltage levels as a function of time. As the illustrated example shows, in the absence of the presently disclosed techniques, an RGW period that is well aligned with acoustic signals received by the first portion 810(1) of receivers in array 810 (Detail E) is less well aligned with acoustic signals received by the second portion 810(2) of receivers in array 810 (Detail F), and misaligned with acoustic signals received by the third portion 810(3) (Detail G) and the fourth portion 810(4) (Detail H) of receivers in array 810.

Figure 11:
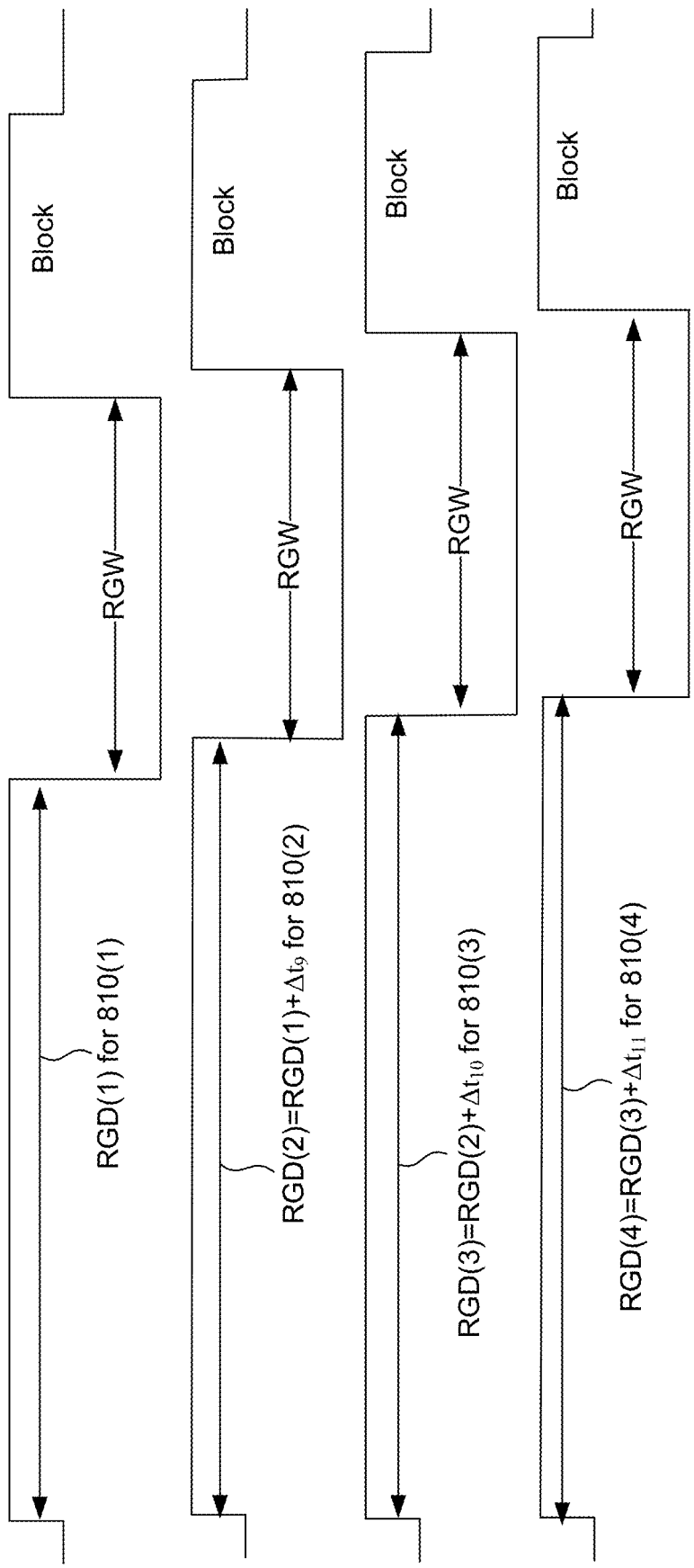
FIG. 11 illustrates a sliding range gate, in accordance with an implementation.

The present inventors have appreciated that the above noted problem can be mitigated by establishing a "sliding range gate" mode of operation. FIG. 11 illustrates a sliding range gate, in accordance with an implementation. In the illustrated implementation, a range gate delay (RGD) value is not uniform for all portions of receivers in the array. Consequently, RGW periods may start, for different portions of the receivers, at different moments in time. In the illustrated example, a first portion of receivers, e.g., portion 810(1) of array 810, has an RGW period that starts at time RGD(1); a second portion of receivers, e.g., portion 810(2) of array 810, has an RGW period that starts at a time RGD(2)=RGD(1)+$\Delta t_9$; a third portion of receivers, e.g., portion 810(3) of array 810, has an RGW period that starts at a time RGD(3)=RGD(2)+$\Delta t_{10}$; a fourth portion of receivers, e.g., portion 810(4) of array 810, has an RGW period that starts at a time RGD(4)=RGD(3)+$\Delta t_{11}$. In the illustrated implementation, temporal delays $\Delta t_9$. $\Delta t_{10}$. and $\Delta t_{11}$ are approximately equal, but this is not necessarily so. In an implementation, temporal delays $\Delta t_9$. $\Delta t_{10}$. and $\Delta t_{11}$ may each be 5-10% of an RGW period. In an implementation, temporal delays $\Delta t_9$. $\Delta t_{10}$. and $\Delta t_{11}$ may be each approximately 25-50 nanoseconds.

In an example implementation, an ultrasonic sensor array may include an M×N array of 'M' rows and 'N' columns. For example, a 1200×1600 array of nearly two million pixels may be contemplated. As a further example, a 1600×1800 array of nearly three million pixels may be contemplated. In some implementations, pixel rows are grouped in portions that include 5-25% of all rows. For example, for the 1200× 1600 array, it may be contemplated to group the 1200 rows into ten portions, each portion including 120 rows. In such an implementation, a first portion of 120 rows may output receiver signals during an RGW that follows an RGD of, for example, 500 nanoseconds. A second portion of 120 rows may output receiver signals during a RGW that follows an RGD of, for example, 525 nanoseconds. A third portion of 120 rows may output receiver signals during a RGW that follows an RGD of, for example, 550 nanoseconds. Similarly, each successive one of the ten portions may be configured to have an RGW that is delayed by an additional 25 nanoseconds with respect to an immediately preceding portion. The tenth portion, accordingly, may output receiver signals during a RGW that follows an RGD of, 725 nanoseconds. Thus, each RGW is shifted (or "slid") temporally with respect to adjacent RGWs.

The sliding range gate mode of operation illustrated in FIG. 11 may be established by a sensor controller (e.g., sensor controller 570 of FIG. 5) for an ultrasonic sensor array (e.g., ultrasonic sensor array 502 of FIG. 5) including a number of ultrasonic sensor pixels (e.g., ultrasonic sensor pixels 534 of FIG. 5). As described above each sensor pixel may include a piezoelectric receiver layer (e.g., receiver layer 436 of FIG. 4) and a receiver bias electrode (e.g., receiver bias electrode 540 of FIG. 5). Each sensor pixel may be operable in one or both of a transmit mode of operation or a read mode of operation. The sensor controller, being electrically coupled with the receiver bias electrodes, may be configured to set, at each sensor pixel a RGW by applying to a respective receiver bias electrode, a modulated voltage bias that enables or disables the read mode of operation. The sensor controller may be further configured to establish different RGWs for different portions of the ultrasonic sensor array. More particularly, for example, the sensor controller may be configured to set, for a first portion of the ultrasonic sensor pixels, a first RGW and to set, for a second portion of the ultrasonic sensor pixels, a second RGW, and to establish a first temporal delay between the first RGW and the second RGW. More generally, where each portion is identified by an integer, 'k', the RGW of each portion k+1 may be delayed with respect to the RGW of portion k by a temporal delay.

Figure 12:
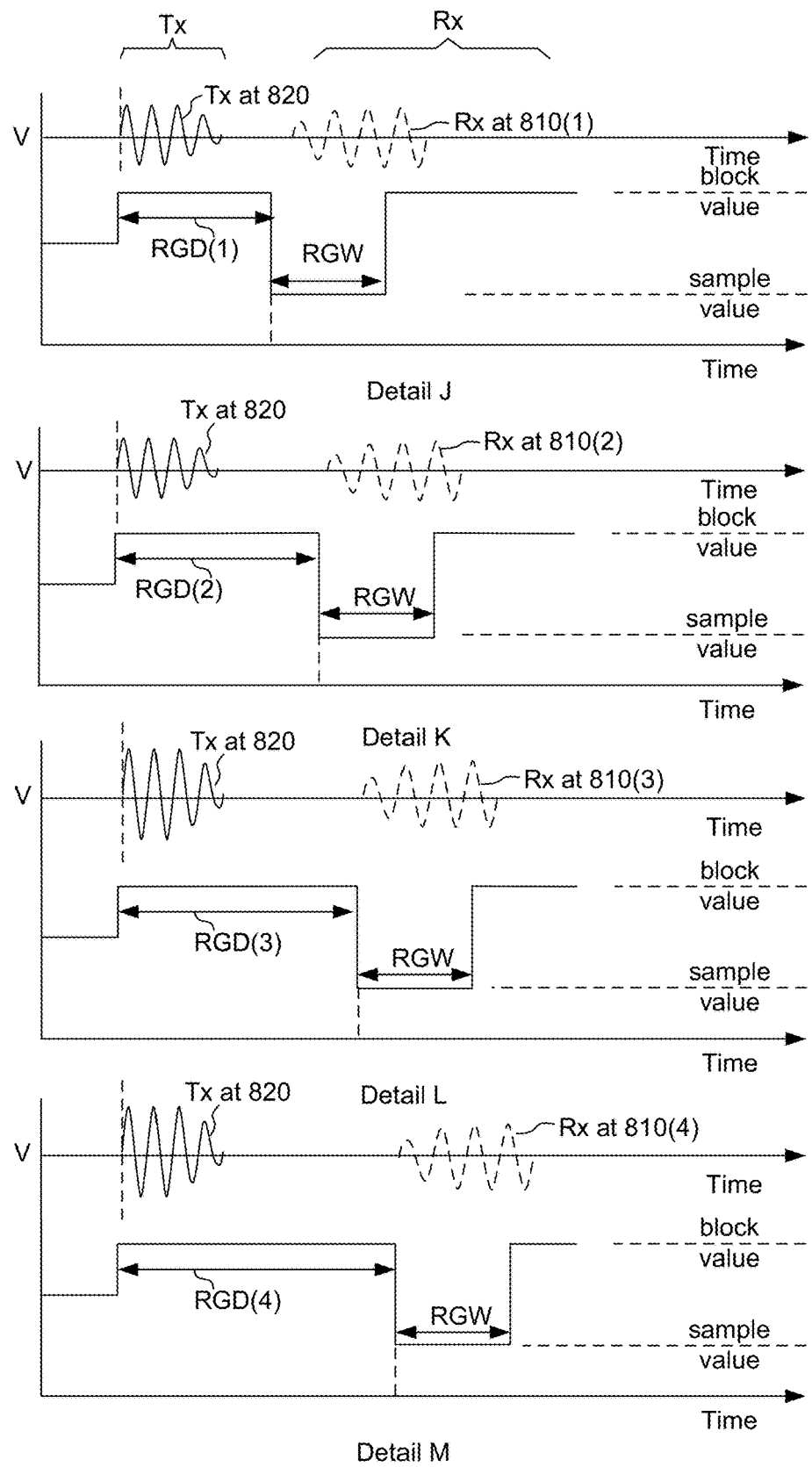
FIG. 12 graphically illustrates an example of transmitter excitation signals and receiver bias voltage levels as a function of time, in accordance with an implementation.

FIG. 12 graphically illustrates an example of transmitter excitation signals and receiver bias voltage levels as a function of time, in accordance with an implementation. As the illustrated example shows, the presently disclosed techniques provide an RGW period that is well aligned not only with acoustic signals received by the first portion 810(1) of receivers in array 810 (Detail J) but also with acoustic signals received by the second portion 810(2) (Detail K) the third portion 810(3) (Detail L) and the fourth portion 810(4) (Detail M) of receivers in array 810.

Although a portion of receivers, as the term is used herein, could be as small as one receiver, a size of each portion may advantageously be selected to be 5-25% of the total number of receivers for an array of the size contemplated by the present disclosure. For example, for a 1200×1600 array, ten portions of about 120 rows each may each have a respective RGW. The incremental delay step size between the start of each successive RGW may be about 25 nanoseconds in some implementations. As a result, each portion's RGW is not more than 25 nanoseconds from an optimal temporal location. The incremental delay step size between start of each successive RGW may be constant some implementations. In other implementations a variable incremental delay step size may be contemplated.

Figure 13:
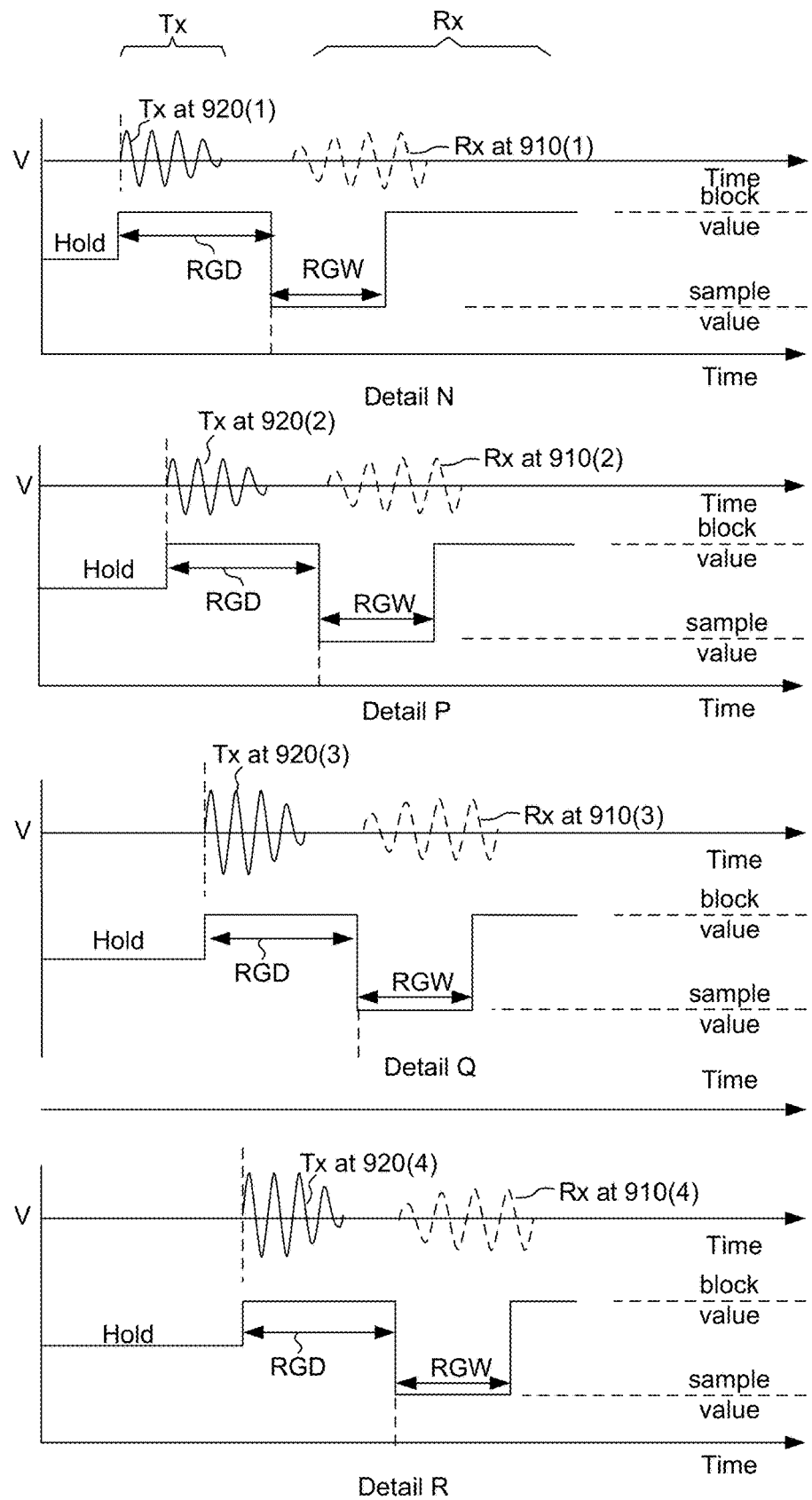
FIG. 13 graphically illustrates an example of transmitter excitation signals and receiver bias voltage levels as a function of time, in accordance with another implementation.

In the graphs depicted in FIG. 12, the RGD period starts, for each portion, at the same time, whereas the length of the RGD period gradually increases, so as to delay the start of the RGW period (comparing the RGW period of the second portion, Detail K, with the RGW period of the first portion, Detail J, for example). Alternatively or in addition, the start of one or more RGB periods may be delayed by increasing the duration of a preceding hold period. FIG. 13 graphically illustrates an example of transmitter excitation signals and receiver bias voltage levels as a function of time, in accordance with such an implementation. In the illustrated example, a start of each RGD is delayed, with respect to a preceding RGD. In the illustrated example, the duration of each RGB is approximately equal, but this is not necessarily so.

Figure 14:
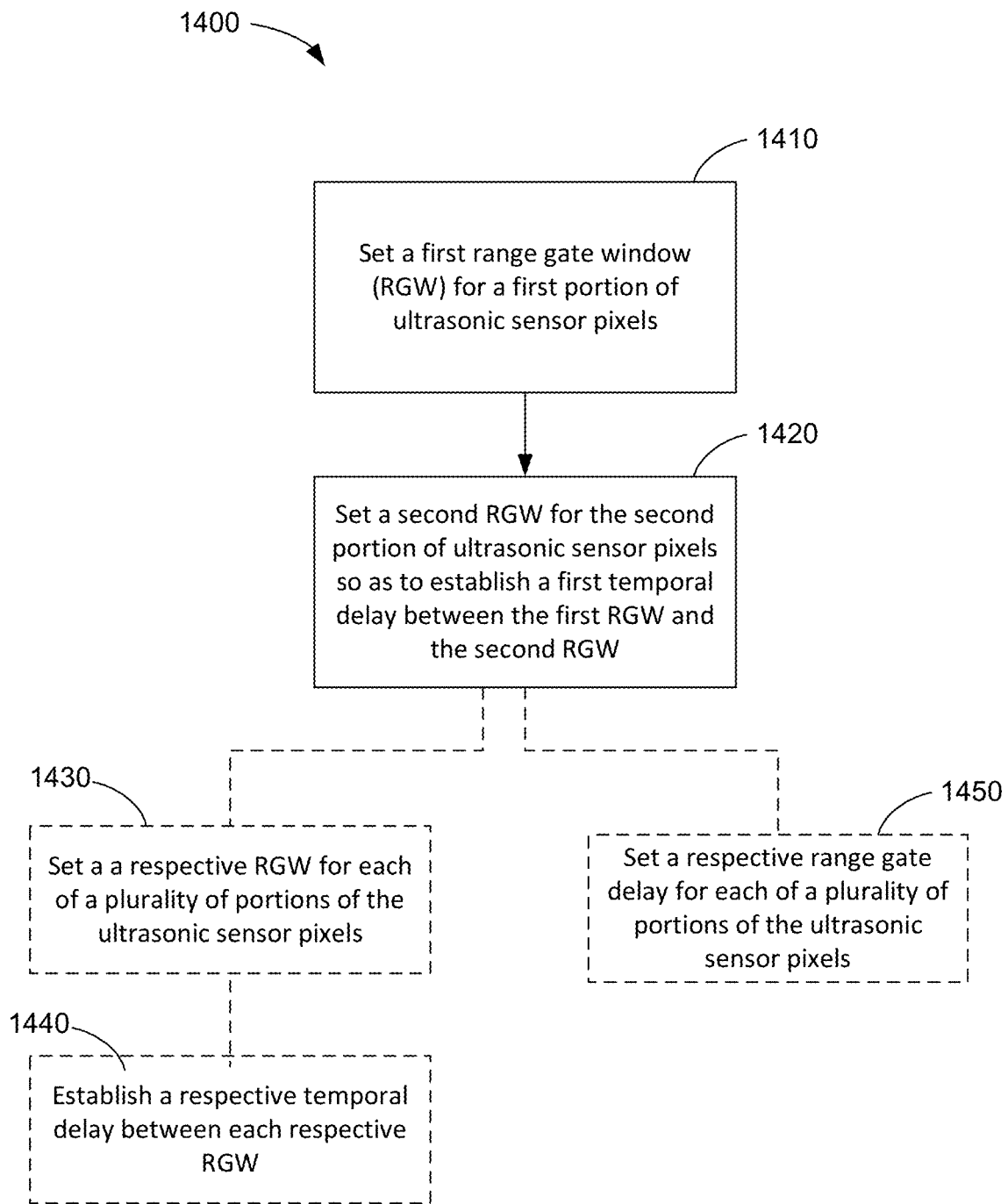
FIG. 14 illustrates an example of a process flow for operating an ultrasonic sensor array.

FIG. 14 illustrates an example of a process flow for operating an ultrasonic sensor array. As described hereinabove, the ultrasonic array may include a first portion of ultrasonic sensor pixels and a second portion of ultrasonic sensor pixels. The method 1400 includes a block 1410 of setting, with a sensor controller, a first range gate window (RGW) for the first portion of ultrasonic sensor pixels. As described hereinabove, each sensor pixel may include an ultrasonic receiver and a receiver bias electrode and is operable in one or both of a transmit mode of operation or a read mode of operation. The sensor controller may be electrically coupled with the receiver bias electrodes. Setting the first RGW may include modulating a bias voltage applied to the receiver bias electrode.

At block 1420, the sensor controller sets a second RGW for the second portion of ultrasonic sensor pixels so as to establish a first temporal delay between the first RGW and the second RGW. The ultrasonic sensor array may be configured to establish a temporal phasing of acoustic signals returned, as a result of interaction with a target object, to the ultrasonic sensor array such that the first portion of the ultrasonic sensor pixels receives the returned acoustic signals at a different time than the second portion of the ultrasonic sensor pixels.

Optionally, the method 1400 may include setting, at block 1430, for each of a plurality of portions of the ultrasonic sensor pixels, a respective RGW. Optionally, the method 1400 may further include establishing, at block 1440, a respective temporal delay between each respective RGW.

Alternatively or in addition the method 1400 may optionally include setting, at block 1450 a respective range gate delay (RGD) with the sensor controller, for each of a plurality of portions of the ultrasonic sensor pixels.

Thus, a sliding range gate for a large area ultrasonic sensor has been disclosed. It will be appreciated that a number of alternative configurations and operating techniques may be contemplated.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by or to control the operation of data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus comprising:
   an ultrasonic sensor array including a plurality of ultrasonic sensor pixels, each sensor pixel including an ultrasonic receiver and a receiver bias electrode and being operable in one or both of a transmit mode of operation or a read mode of operation; and
   a sensor controller electrically coupled with the receiver bias electrodes;
   wherein
      the sensor controller is configured to set, at each sensor pixel, a range gate window (RGW) by modulating a bias voltage applied to the receiver bias electrode;
      the sensor controller is configured to set, for a first portion of the ultrasonic sensor pixels, a first RGW; and
      the sensor controller is configured to set, for a second portion of the ultrasonic sensor pixels, a second RGW, and establish a first temporal delay between the first RGW and the second RGW.

2. The apparatus of claim 1, wherein the apparatus is configured to establish a temporal phasing of acoustic signals returned, as a result of interaction with a target object, to the ultrasonic sensor array such that the first portion of the ultrasonic sensor pixels receives the returned acoustic signals at a different time than the second portion of the ultrasonic sensor pixels.

3. The apparatus of claim 2, wherein:
   the ultrasonic receivers are disposed in a receiver array layer;
   the ultrasonic sensor array includes ultrasonic transmitters disposed in a transmitter array layer; and
   the receiver array layer is not parallel with the transmitter array layer.

4. The apparatus of claim 3, wherein a non-uniform separation between the receiver array layer and the transmitter array layer establishes the temporal phasing of the returned acoustic signals.

5. The apparatus of claim 2, wherein:
   the ultrasonic sensor array includes ultrasonic transmitters disposed in a transmitter array layer;
   the transmitter array layer is segmented into separate portions; and
   the sensor controller is configured to cause the ultrasonic transmitters to launch acoustic signals, from the separate portions, non-simultaneously so as to establish the temporal phasing of the returned acoustic signals.

6. The apparatus of claim 1, wherein the first RGW has a first RGW duration and the first temporal delay is approximately 5-25% of the first RGW duration.

7. The apparatus of claim 6, wherein the first RGW duration is between 200 nanoseconds and 1000 nanoseconds.

8. The apparatus of claim 1, wherein the first temporal delay is approximately 25 nanoseconds.

9. The apparatus of claim 1, wherein the sensor controller is configured to set, for each of a plurality of portions of the ultrasonic sensor pixels a respective RGW and to establish a respective temporal delay between each respective RGW.

10. The apparatus of claim 1, wherein the sensor controller is configured to set, for each of a plurality of portions the sensor controller is configured to set a respective range gate delay (RGD).

11. The apparatus of claim 10, wherein the plurality of portions includes a first portion and an adjacent second portion, and wherein the RGD for the second portion is longer than the RGD for the first portion by a temporal delay period.

12. The apparatus of claim 11, wherein the first RGW has a first RGW duration and the temporal delay period is approximately 5-25% of the first RGW duration.

13. A method for operating an ultrasonic sensor array, the ultrasonic array including a first portion of ultrasonic sensor pixels and a second portion of ultrasonic sensor pixels, the method comprising:
   setting, with a sensor controller, a first range gate window (RGW) for the first portion of ultrasonic sensor pixels;
   setting, with the sensor controller, a second RGW for the second portion of ultrasonic sensor pixels so as to establish a first temporal delay between the first RGW and the second RGW; wherein
      each sensor pixel includes an ultrasonic receiver and a receiver bias electrode and is operable in one or both of a transmit mode of operation or a read mode of operation;
      the sensor controller is electrically coupled with the receiver bias electrodes; and
      setting the first RGW and the second RGW includes modulating a bias voltage applied to the receiver bias electrode.

14. The method of claim 13, wherein the ultrasonic sensor array is configured to establish a temporal phasing of acoustic signals returned, as a result of interaction with a target object, to the ultrasonic sensor array such that the first portion of the ultrasonic sensor pixels receives the returned acoustic signals at a different time than the second portion of the ultrasonic sensor pixels.

15. The method of claim 13, further comprising setting, with the sensor controller, for each of a plurality of portions of the ultrasonic sensor pixels a respective RGW and establishing, with the sensor controller, a respective temporal delay between each respective RGW.

16. The method of claim 13, further comprising setting, with the sensor controller, for each of a plurality of portions of the ultrasonic sensor pixels, a respective range gate delay (RGD).

17. The method of claim 16 wherein the plurality of portions includes a first portion and an adjacent second portion, and wherein the RGD for the second portion is longer than the RGD for the first portion by a temporal delay period.

18. The method of claim 17, wherein the first RGW has a first RGW duration and the temporal delay period is approximately 5-25% of the first RGW duration.

19. A non-transitory computer readable medium storing program code to be executed by a sensor controller of an ultrasonic sensor array, the ultrasonic array including a first portion of ultrasonic sensor pixels and a second portion of ultrasonic sensor pixels, the program code comprising instructions configured to cause the sensor controller to:
set, with a sensor controller, a first range gate window (RGW) for the first portion of ultrasonic sensor pixels;
set, with the sensor controller, a second RGW for the second portion of ultrasonic sensor pixels so as to establish a first temporal delay between the first RGW and the second RGW; wherein
each sensor pixel includes an ultrasonic receiver and a receiver bias electrode and is operable in one or both of a transmit mode of operation or a read mode of operation;
the sensor controller is electrically coupled with the receiver bias electrodes; and
setting the first RGW and the second RGW includes modulating a bias voltage applied to the receiver bias electrode.

20. The computer readable medium of claim 19, wherein the ultrasonic sensor array is configured to establish a temporal phasing of acoustic signals returned, as a result of interaction with a target object, to the ultrasonic sensor array such that the first portion of the ultrasonic sensor pixels receive the returned acoustic signals at a different time than the second portion of the ultrasonic sensor pixels.

21. The computer readable medium of claim 19, further comprising instructions to cause the sensor controller to set, for each of a plurality of portions of the ultrasonic sensor pixels a respective RGW and establish a respective temporal delay between each respective RGW.

22. The computer readable medium of claim 19, further comprising instructions to cause the sensor controller to set, for each of a plurality of portions, a respective range gate delay (RGD).

23. The computer readable medium of claim 22 wherein the plurality of portions includes a first portion and an adjacent second portion, and wherein the RGD for the second portion is longer than the RGD for the first portion by a temporal delay period.

24. The computer readable medium of claim 23, wherein the first RGW has a first RGW duration and the temporal delay period is approximately 5-25% of the first RGW duration.

25. An apparatus comprising:
an ultrasonic sensor array including a plurality of ultrasonic sensor pixels, each sensor pixel including an ultrasonic receiver and a receiver bias electrode and being operable in one or both of a transmit mode of operation or a read mode of operation; and, electrically coupled with the receiver bias electrodes, means for controlling the ultrasonic sensor array, the means configured to:
set, at each sensor pixel, a range gate window (RGW) by modulating a bias voltage applied to the receiver bias electrode;
set, for a first portion of the ultrasonic sensor pixels, a first RGW; and
set, for a second portion of the ultrasonic sensor pixels, a second RGW, and establish a first temporal delay between the first RGW and the second RGW.

26. The apparatus of claim 25, wherein the apparatus is configured to establish a temporal phasing of acoustic signals returned, as a result of interaction with a target object, to the ultrasonic sensor array such that the first portion of the ultrasonic sensor pixels receives the returned acoustic signals at a different time than the second portion of the ultrasonic sensor pixels.

27. The apparatus of claim 26, wherein:
the ultrasonic receivers are disposed in a receiver array layer;
the ultrasonic sensor array includes ultrasonic transmitters disposed in a transmitter array layer; and
the receiver array layer is not parallel with the transmitter array layer.

28. The apparatus of claim 27, a non-uniform separation between the receiver array layer and the transmitter array layer establishes the temporal phasing of the returned acoustic signals.

29. The apparatus of claim 26, wherein:
the ultrasonic sensor array includes ultrasonic transmitters disposed in a transmitter array layer;
the transmitter array layer is segmented into separate portions; and
the means for controlling the ultrasonic sensor array is configured to cause the ultrasonic transmitters to launch acoustic signals, from the separate portions, non-simultaneously so as to establish the temporal phasing of the returned acoustic signals.

30. The apparatus of claim 25, wherein the means for controlling the ultrasonic sensor array is configured to set, for each of a plurality of portions of the ultrasonic sensor pixels a respective RGW and to establish a respective temporal delay between each respective RGW.

* * * * *